United States Patent
Bone et al.

(10) Patent No.: US 10,890,757 B2
(45) Date of Patent: Jan. 12, 2021

(54) OPTICAL IMAGING LENS

(71) Applicant: Genius Electronic Optical Co., Ltd., Taichung (TW)

(72) Inventors: Matthew Bone, Fujian (CN); Chuanbo Dong, Fujian (CN); Xiaohui Zhang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 42 days.

(21) Appl. No.: 15/712,165

(22) Filed: Sep. 22, 2017

(65) Prior Publication Data

US 2019/0049696 A1 Feb. 14, 2019

(30) Foreign Application Priority Data

Aug. 8, 2017 (CN) .......................... 2017 1 0670098

(51) Int. Cl.
| | | |
|---|---|---|
| *G02B 27/00* | (2006.01) | |
| *G02B 5/20* | (2006.01) | |
| *G02B 13/18* | (2006.01) | |
| *G02B 13/00* | (2006.01) | |
| *G02B 9/34* | (2006.01) | |

(52) U.S. Cl.
CPC ............... *G02B 27/00* (2013.01); *G02B 5/20* (2013.01); *G02B 9/34* (2013.01); *G02B 13/00* (2013.01); *G02B 13/18* (2013.01)

(58) Field of Classification Search
CPC . G02B 5/20; G02B 9/34; G02B 13/18; G02B 27/0025; G02B 13/004

USPC .................................................. 359/708, 715
See application file for complete search history.

(56) References Cited

U.S. PATENT DOCUMENTS

| | | | | |
|---|---|---|---|---|
| 6,950,246 B2* | 9/2005 | Amanai | ................... | G02B 9/34 359/771 |
| 7,012,765 B2* | 3/2006 | Matsui | ..................... | G02B 9/34 359/771 |
| 7,248,421 B2* | 7/2007 | Amanai | ................... | G02B 9/34 359/715 |
| 7,375,903 B2* | 5/2008 | Taniyama | ................ | G02B 9/34 359/715 |
| 7,995,285 B2* | 8/2011 | Lin | ....................... | G02B 15/163 359/683 |
| 8,411,377 B2* | 4/2013 | Tsai | ..................... | G02B 13/004 359/715 |
| 8,704,937 B2* | 4/2014 | Matsusaka | .............. | G02B 3/00 348/340 |

(Continued)

*Primary Examiner* — James R Greece
(74) *Attorney, Agent, or Firm* — JCIPRNET

(57) ABSTRACT

An optical imaging lens includes a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The object-side surface of the second lens element has a concave portion in a vicinity of the optical axis. The image-side surface of the second lens element has a convex portion in a vicinity of a periphery of the second lens element. The object-side surface of the third lens element has a concave portion in a vicinity of a periphery of the third lens element. The fourth lens element has negative refracting power.

21 Claims, 36 Drawing Sheets

(56) References Cited

U.S. PATENT DOCUMENTS

| | | | | |
|---|---|---|---|---|
| 8,879,168 B1* | 11/2014 | Hsu | ............ | G02B 13/004 359/715 |
| 8,896,937 B1* | 11/2014 | Hsueh | ............ | G02B 13/004 359/715 |
| 8,908,291 B1* | 12/2014 | Chung | ............ | G02B 13/004 359/715 |
| 8,922,914 B2* | 12/2014 | Chen | ............ | G02B 13/004 359/715 |
| 9,069,138 B2* | 6/2015 | Chae | ............ | G02B 13/004 |
| 9,213,166 B2* | 12/2015 | Chang | ............ | H04N 5/225 |
| 9,223,062 B2* | 12/2015 | Yuza | ............ | G02B 3/04 |
| 9,316,809 B2* | 4/2016 | Hsu | ............ | G02B 13/004 |
| 9,341,857 B2* | 5/2016 | Suzuki | ............ | G02B 27/42 |
| 9,513,534 B2* | 12/2016 | Chen | ............ | G02B 13/004 |
| 9,632,286 B2* | 4/2017 | Liu | ............ | G02B 9/34 |
| 9,645,355 B2* | 5/2017 | Son | ............ | G02B 13/004 |
| 9,664,878 B2* | 5/2017 | Tang | ............ | G02B 9/34 |
| 2008/0180813 A1* | 7/2008 | Taniyama | ............ | G02B 13/006 359/715 |
| 2009/0185288 A1* | 7/2009 | Taniyama | ............ | G02B 9/34 359/715 |
| 2010/0020417 A1* | 1/2010 | Lin | ............ | G02B 9/34 359/715 |
| 2010/0020418 A1* | 1/2010 | Onoda | ............ | G02B 9/34 359/715 |
| 2010/0046090 A1* | 2/2010 | Okano | ............ | G02B 9/34 359/715 |
| 2011/0058089 A1* | 3/2011 | Tang | ............ | G02B 13/004 348/340 |
| 2012/0113529 A1* | 5/2012 | Ko | ............ | G02B 13/004 359/715 |
| 2012/0250164 A1* | 10/2012 | Tsai | ............ | G02B 13/004 359/715 |
| 2013/0044379 A1* | 2/2013 | Hsieh | ............ | G02B 13/004 359/715 |
| 2013/0070347 A1* | 3/2013 | Tang | ............ | G02B 9/34 359/715 |
| 2013/0188264 A1* | 7/2013 | Hashimoto | ............ | G02B 9/34 359/715 |
| 2014/0055870 A1* | 2/2014 | Chang | ............ | G02B 13/004 359/715 |
| 2014/0085737 A1* | 3/2014 | Oh | ............ | G02B 13/004 359/715 |
| 2014/0198397 A1* | 7/2014 | Sekine | ............ | G02B 13/004 359/715 |
| 2015/0009581 A1* | 1/2015 | Chen | ............ | G02B 13/004 359/715 |
| 2015/0098009 A1* | 4/2015 | Hsieh | ............ | G02B 13/004 348/360 |
| 2015/0116847 A1* | 4/2015 | Liao | ............ | G02B 13/004 359/715 |
| 2015/0331223 A1* | 11/2015 | Kuo | ............ | G02B 13/004 359/715 |
| 2016/0011397 A1* | 1/2016 | Chiang | ............ | G02B 13/004 359/715 |
| 2016/0131868 A1* | 5/2016 | Hsu | ............ | G02B 13/004 348/335 |
| 2016/0154216 A1* | 6/2016 | Liao | ............ | G02B 13/004 348/335 |
| 2018/0024317 A1* | 1/2018 | Lai | ............ | G02B 13/004 359/715 |
| 2018/0024318 A1* | 1/2018 | Lai | ............ | G02B 5/005 359/715 |

\* cited by examiner

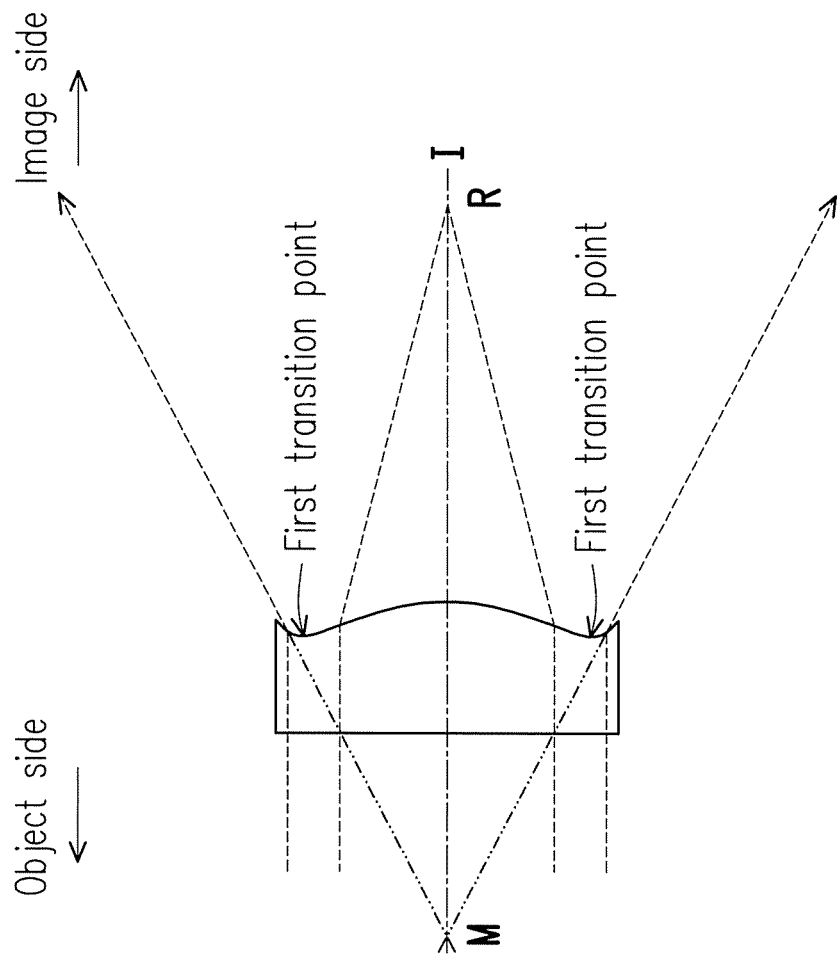
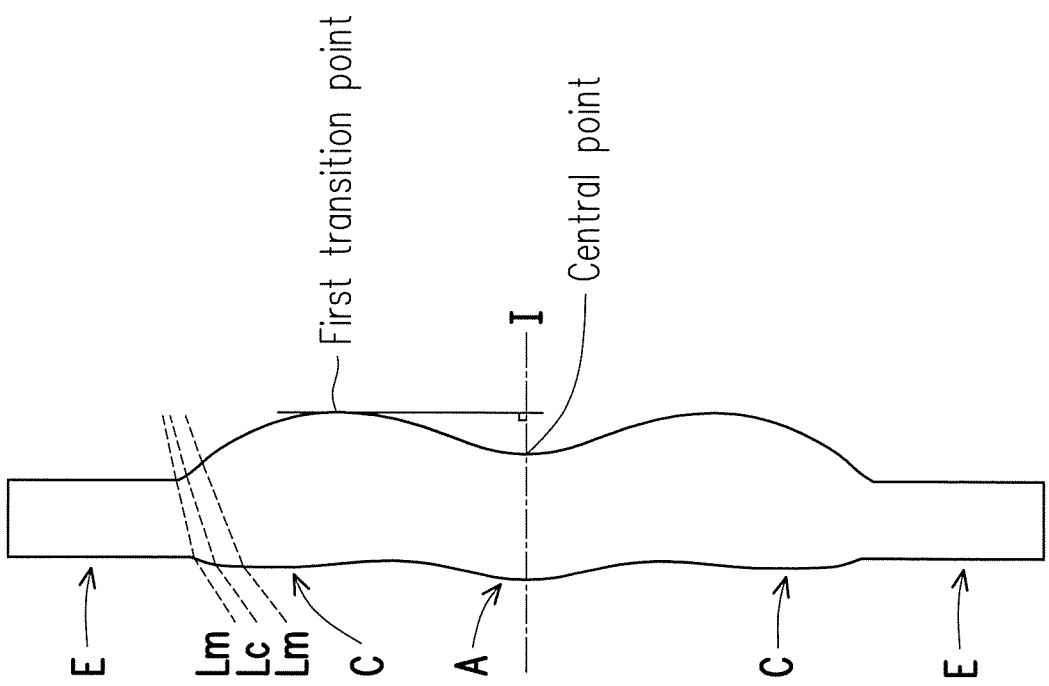

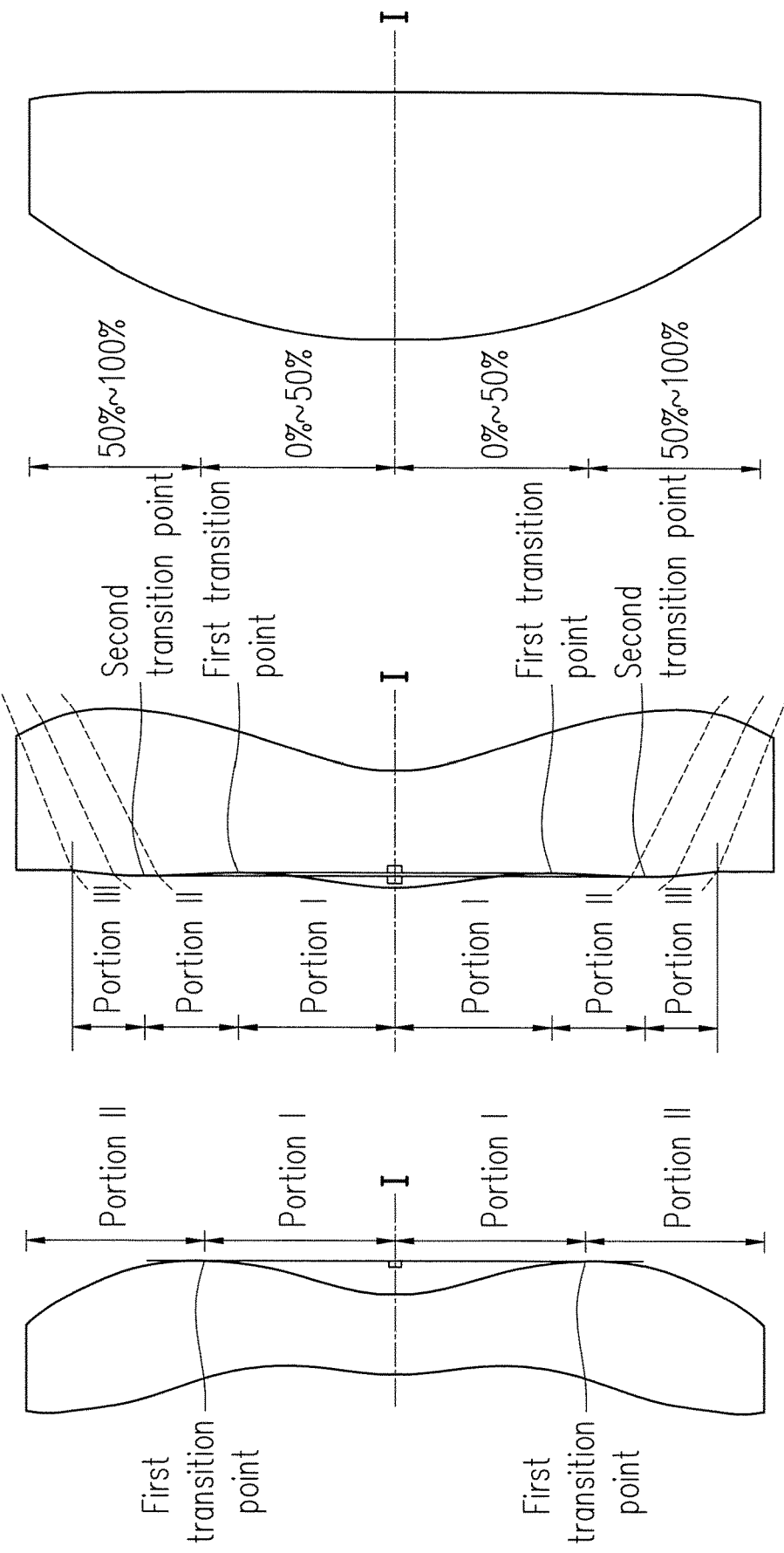

| First embodiment |||||||
|---|---|---|---|---|---|---|
| Effective focal length=2.759 mm , Half field of view=38.288°, f-number=2.157, System length=4.088 mm, Image height=2.275 mm |||||||
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 1.890 | 0.527 | 1.642 | 22.409 | 3.362 |
| | Image-side surface 32 | 18.348 | 0.338 | | | |
| Second lens element 4 | Object-side surface 41 | -7.619 | 0.489 | 1.642 | 22.409 | 1203.958 |
| | Image-side surface 42 | -7.727 | 0.150 | | | |
| Third lens element 5 | Object-side surface 51 | -1.271 | 0.645 | 1.642 | 22.409 | 1.815 |
| | Image-side surface 52 | -0.712 | 0.024 | | | |
| Fourth lens element 6 | Object-side surface 61 | 2.212 | 0.433 | 1.545 | 55.987 | -2.097 |
| | Image-side surface 62 | 0.694 | 0.782 | | | |
| Filter 9 | Object-side surface 91 | Infinity | 0.400 | 1.523 | 54.512 | |
| | Image-side surface 92 | Infinity | 0.300 | | | |
| | Image plane 100 | Infinity | | | | |

FIG. 8

| Surface | K | $a_4$ | $a_6$ | $a_8$ | $a_{10}$ |
|---|---|---|---|---|---|
| 31 | -3.319680E+00 | 1.794346E-02 | -4.875315E-02 | -1.703951E-01 | 8.050217E-01 |
| 32 | -5.525333E+02 | -1.227118E-01 | -3.130222E-01 | 6.954682E-01 | -1.588102E+00 |
| 41 | 3.510174E+00 | -3.211101E-01 | 4.789405E-02 | -9.616004E-01 | 1.360916E+00 |
| 42 | -3.070228E+01 | -2.837771E-01 | 1.550704E-01 | -2.054137E-01 | 1.965102E-01 |
| 51 | -1.755136E-01 | -3.474237E-02 | 2.434691E-01 | 2.292180E-01 | -2.364494E-01 |
| 52 | -3.574854E+00 | -2.319667E-01 | 1.993523E-01 | 6.641310E-02 | 3.469611E-03 |
| 61 | -5.715722E+00 | -1.438092E-01 | 5.518452E-02 | -1.757127E-02 | 3.919190E-03 |
| 62 | -5.316632E+00 | -9.928516E-02 | 4.695902E-02 | -1.864444E-02 | 3.585380E-03 |
| Surface | $a_{12}$ | $a_{14}$ | $a_{16}$ | | |
| 31 | -3.628147E+00 | 7.434702E+00 | -6.277124E+00 | | |
| 32 | 6.541005E-01 | 2.382537E+00 | -2.657152E+00 | | |
| 41 | -2.112436E+00 | 5.529935E+00 | -4.411380E+00 | | |
| 42 | 7.388509E-02 | -2.817736E-01 | 1.712005E-01 | | |
| 51 | -2.152262E-01 | 1.256283E-01 | 6.045647E-02 | | |
| 52 | -5.988950E-02 | -8.293125E-03 | 1.852746E-02 | | |
| 61 | -7.480017E-04 | 4.803660E-04 | -9.098590E-05 | | |
| 62 | 2.730169E-04 | -2.616264E-04 | 3.426748E-05 | | |

FIG. 9

| Second embodiment | | | | | | |
|---|---|---|---|---|---|---|
| Effective focal length=2.355 mm , Half field of view=42.524°, f-number=1.841, System length=3.763 mm, Image height=1.974 mm | | | | | | |
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 1.720 | 0.456 | 1.642 | 22.409 | 3.681 |
| | Image-side surface 32 | 6.306 | 0.342 | | | |
| Second lens element 4 | Object-side surface 41 | -23.825 | 0.753 | 1.642 | 22.409 | 7.016 |
| | Image-side surface 42 | -3.718 | 0.105 | | | |
| Third lens element 5 | Object-side surface 51 | -1.234 | 0.618 | 1.642 | 22.409 | 1.538 |
| | Image-side surface 52 | -0.640 | 0.011 | | | |
| Fourth lens element 6 | Object-side surface 61 | 1.144 | 0.294 | 1.545 | 55.987 | -1.673 |
| | Image-side surface 62 | 0.458 | 0.528 | | | |
| Filter 9 | Object-side surface 91 | Infinity | 0.400 | 1.523 | 54.512 | |
| | Image-side surface 92 | Infinity | 0.255 | | | |
| | Image plane 100 | Infinity | | | | |

FIG. 12

| Surface | K | $a_4$ | $a_6$ | $a_8$ | $a_{10}$ |
|---|---|---|---|---|---|
| 31 | -2.737789E+00 | 2.580496E-02 | -4.465858E-02 | -1.974710E-01 | 7.711604E-01 |
| 32 | 1.568722E+01 | -1.145861E-01 | -3.301339E-01 | 6.411744E-01 | -1.619455E+00 |
| 41 | -1.198625E+04 | -2.776066E-01 | 1.145217E-01 | -9.270103E-01 | 1.085251E+00 |
| 42 | -3.192148E+00 | -2.672558E-01 | 1.666313E-01 | -2.201740E-01 | 1.790920E-01 |
| 51 | -5.009950E-02 | -1.238652E-01 | 2.339046E-01 | 2.748913E-01 | -2.048789E-01 |
| 52 | -3.782926E+00 | -2.713348E-01 | 1.945366E-01 | 5.833043E-02 | 2.458277E-03 |
| 61 | -6.211211E+00 | -1.614957E-01 | 5.336531E-02 | -1.691550E-02 | 3.939301E-03 |
| 62 | -3.629396E+00 | -1.127249E-01 | 5.424041E-02 | -1.914839E-02 | 3.123463E-03 |
| Surface | $a_{12}$ | $a_{14}$ | $a_{16}$ | | |
| 31 | -3.540540E+00 | 7.721108E+00 | -7.108128E+00 | | |
| 32 | 6.412452E-01 | 2.308031E+00 | -2.611201E+00 | | |
| 41 | -2.800395E+00 | 5.058649E+00 | -2.535686E+00 | | |
| 42 | 6.232310E-02 | -2.856775E-01 | 1.745449E-01 | | |
| 51 | -2.094743E-01 | 1.135020E-01 | 3.960084E-02 | | |
| 52 | -5.727130E-02 | -7.164989E-03 | 1.675883E-02 | | |
| 61 | -8.137152E-04 | 4.581131E-04 | -9.005716E-05 | | |
| 62 | 2.097837E-04 | -2.649187E-04 | 3.496823E-05 | | |

FIG. 13

| Third embodiment | | | | | | |
|---|---|---|---|---|---|---|
| Effective focal length=2.603 mm, Half field of view=42.520°, f-number=2.034, System length=3.941 mm, Image height=2.538 mm | | | | | | |
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 1.869 | 0.473 | 1.642 | 22.409 | 3.677 |
| | Image-side surface 32 | 9.437 | 0.723 | | | |
| Second lens element 4 | Object-side surface 41 | -3.327 | 0.394 | 1.642 | 22.409 | 71.372 |
| | Image-side surface 42 | -3.234 | 0.059 | | | |
| Third lens element 5 | Object-side surface 51 | -1.413 | 0.493 | 1.642 | 22.409 | 3.032 |
| | Image-side surface 52 | -0.914 | 0.011 | | | |
| Fourth lens element 6 | Object-side surface 61 | 1.729 | 0.593 | 1.545 | 55.987 | -4.488 |
| | Image-side surface 62 | 0.886 | 0.496 | | | |
| Filter 9 | Object-side surface 91 | Infinity | 0.400 | 1.523 | 54.512 | |
| | Image-side surface 92 | Infinity | 0.300 | | | |
| | Image plane 100 | Infinity | | | | |

FIG. 16

| Surface | K | $a_4$ | $a_6$ | $a_8$ | $a_{10}$ |
|---|---|---|---|---|---|
| 31 | -2.259104E+00 | 3.398168E-02 | -2.608376E-02 | -7.325349E-02 | 9.592885E-01 |
| 32 | 1.332287E+02 | -2.547662E-02 | -2.293402E-01 | 7.777574E-01 | -1.603312E+00 |
| 41 | -9.001221E+01 | -4.362581E-01 | 3.569946E-01 | -1.029083E+00 | 1.017681E+00 |
| 42 | 3.579301E+00 | -3.638109E-01 | 2.665439E-01 | -3.587419E-01 | 2.560769E-01 |
| 51 | 3.582149E-02 | -1.366144E-01 | 1.960908E-01 | 3.044629E-01 | -1.781022E-01 |
| 52 | -2.245928E+00 | -1.386950E-01 | 1.074431E-01 | 2.595589E-02 | 2.179224E-02 |
| 61 | -4.308813E+00 | -1.862696E-01 | 7.841549E-02 | -1.740111E-02 | 2.358263E-03 |
| 62 | -3.767010E+00 | -1.167399E-01 | 5.086362E-02 | -1.549856E-02 | 9.784438E-04 |
| Surface | $a_{12}$ | $a_{14}$ | $a_{16}$ | | |
| 31 | -3.872450E+00 | 6.505167E+00 | -4.089937E+00 | | |
| 32 | 4.826056E-01 | 2.226430E+00 | -2.357509E+00 | | |
| 41 | -2.386118E+00 | 5.394795E+00 | -4.036474E+00 | | |
| 42 | 1.467083E-01 | -2.936088E-01 | 5.355849E-02 | | |
| 51 | -2.010823E-01 | 1.018836E-01 | 1.363239E-02 | | |
| 52 | -3.629399E-02 | -1.995754E-03 | 6.614837E-03 | | |
| 61 | -1.184611E-03 | 4.545476E-04 | -5.204031E-05 | | |
| 62 | 4.585632E-04 | -9.975318E-05 | 4.990766E-06 | | |

FIG. 17

| Fourth embodiment |||||||
|---|---|---|---|---|---|---|
| Effective focal length=2.681 mm , Half field of view=42.524°, f-number=2.095, System length=4.227 mm, Image height=2.205 mm |||||||
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 2.136 | 0.508 | 1.642 | 22.409 | 4.148 |
| | Image-side surface 32 | 11.535 | 0.389 | | | |
| Second lens element 4 | Object-side surface 41 | -205.289 | 0.423 | 1.642 | 22.409 | 9.800 |
| | Image-side surface 42 | -5.898 | 0.131 | | | |
| Third lens element 5 | Object-side surface 51 | -2.161 | 1.160 | 1.642 | 22.409 | 1.004 |
| | Image-side surface 52 | -0.582 | 0.014 | | | |
| Fourth lens element 6 | Object-side surface 61 | 3.331 | 0.321 | 1.545 | 55.987 | -1.026 |
| | Image-side surface 62 | 0.456 | 0.659 | | | |
| Filter 9 | Object-side surface 91 | Infinity | 0.400 | 1.523 | 54.512 | |
| | Image-side surface 92 | Infinity | 0.222 | | | |
| | Image plane 100 | Infinity | | | | |

FIG. 20

| Surface | K | $a_4$ | $a_6$ | $a_8$ | $a_{10}$ |
|---|---|---|---|---|---|
| 31 | -3.769421E+00 | 1.099379E-02 | -4.794435E-02 | -1.273858E-01 | 9.044543E-01 |
| 32 | -3.015795E+02 | -7.303415E-02 | -2.507315E-01 | 5.573947E-01 | -1.198356E+00 |
| 41 | 0.000000E+00 | -2.744372E-01 | 3.691087E-02 | -6.707036E-01 | 1.003821E+00 |
| 42 | 3.066613E+01 | -3.698059E-01 | 1.802124E-01 | -2.590588E-01 | 1.668623E-01 |
| 51 | 1.692389E+00 | -2.492013E-01 | 4.813148E-02 | 3.743264E-01 | -8.310143E-02 |
| 52 | -4.340488E+00 | -2.161699E-01 | 1.568882E-01 | -5.511151E-02 | 3.605469E-02 |
| 61 | -2.736382E+01 | -1.308013E-01 | 6.880632E-02 | -2.328118E-02 | 3.565528E-03 |
| 62 | -4.473197E+00 | -9.070652E-02 | 4.721171E-02 | -1.614603E-02 | 1.780067E-03 |
| Surface | $a_{12}$ | $a_{14}$ | $a_{16}$ | | |
| 31 | -3.812003E+00 | 7.072104E+00 | -5.131351E+00 | | |
| 32 | 5.949382E-01 | 9.015128E-01 | -8.653932E-01 | | |
| 41 | -3.085311E+00 | 4.801428E+00 | -2.641776E+00 | | |
| 42 | 1.374742E-01 | -2.366909E-01 | 3.608453E-02 | | |
| 51 | -2.309949E-01 | 4.130275E-02 | 3.144161E-02 | | |
| 52 | -1.772368E-02 | 7.956315E-05 | 1.580228E-03 | | |
| 61 | -9.821637E-04 | 5.315963E-04 | -8.100862E-05 | | |
| 62 | 4.914024E-04 | -1.900543E-04 | 1.762001E-05 | | |

FIG. 21

| Fifth embodiment | | | | | | |
|---|---|---|---|---|---|---|
| Effective focal length=2.755 mm , Half field of view=38.966°, f-number=2.154, System length=3.116 mm, Image height=2.275 mm | | | | | | |
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 1.888 | 0.511 | 1.661 | 20.412 | 3.311 |
| | Image-side surface 32 | 16.921 | 0.375 | | | |
| Second lens element 4 | Object-side surface 41 | -5.577 | 0.453 | 1.642 | 22.409 | -230.331 |
| | Image-side surface 42 | -5.984 | 0.152 | | | |
| Third lens element 5 | Object-side surface 51 | -1.267 | 0.621 | 1.642 | 22.409 | 1.697 |
| | Image-side surface 52 | -0.682 | 0.061 | | | |
| Fourth lens element 6 | Object-side surface 61 | 1.774 | 0.323 | 1.545 | 55.987 | -1.982 |
| | Image-side surface 62 | 0.622 | 0.806 | | | |
| Filter 9 | Object-side surface 91 | Infinity | 0.400 | 1.523 | 54.512 | |
| | Image-side surface 92 | Infinity | 0.300 | | | |
| | Image plane 100 | Infinity | | | | |

FIG. 24

| Surface | K | $a_4$ | $a_6$ | $a_8$ | $a_{10}$ |
|---|---|---|---|---|---|
| 31 | -3.355157E+00 | 1.774414E-02 | -4.783705E-02 | -1.710387E-01 | 7.996522E-01 |
| 32 | -6.393509E+01 | -1.179754E-01 | -3.048658E-01 | 7.029351E-01 | -1.589222E+00 |
| 41 | 4.346616E+00 | -3.237581E-01 | 6.000517E-02 | -9.471532E-01 | 1.366533E+00 |
| 42 | -1.152670E+01 | -2.843788E-01 | 1.546626E-01 | -2.040301E-01 | 1.985135E-01 |
| 51 | -1.848474E-01 | -3.321978E-02 | 2.451380E-01 | 2.295958E-01 | -2.365586E-01 |
| 52 | -3.691159E+00 | -2.316634E-01 | 1.998773E-01 | 6.715421E-02 | 4.041157E-03 |
| 61 | -5.639462E+00 | -1.438709E-01 | 5.504128E-02 | -1.761859E-02 | 3.885274E-03 |
| 62 | -4.896841E+00 | -1.067726E-01 | 4.760521E-02 | -1.886367E-02 | 3.528104E-03 |
| Surface | $a_{12}$ | $a_{14}$ | $a_{16}$ | | |
| 31 | -3.637393E+00 | 7.440836E+00 | -6.179808E+00 | | |
| 32 | 6.365709E-01 | 2.358395E+00 | -2.620032E+00 | | |
| 41 | -2.118051E+00 | 5.517126E+00 | -4.427270E+00 | | |
| 42 | 7.549295E-02 | -2.809848E-01 | 1.710566E-01 | | |
| 51 | -2.153781E-01 | 1.255566E-01 | 6.049035E-02 | | |
| 52 | -5.954700E-02 | -8.133905E-03 | 1.856447E-02 | | |
| 61 | -7.699826E-04 | 4.689174E-04 | -9.619905E-05 | | |
| 62 | 2.654078E-04 | -2.614922E-04 | 3.481306E-05 | | |

FIG. 25

| Sixth embodiment |||||||
|---|---|---|---|---|---|---|
| Effective focal length=2.679 mm , Half field of view=41.251°, f-number=2.094, System length=3.441 mm, Image height=2.275 mm |||||||
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 1.610 | 0.447 | 1.642 | 22.409 | 3.095 |
| | Image-side surface 32 | 9.004 | 0.282 | | | |
| Second lens element 4 | Object-side surface 41 | -2.777 | 0.357 | 1.642 | 22.409 | -1891.717 |
| | Image-side surface 42 | -2.920 | 0.129 | | | |
| Third lens element 5 | Object-side surface 51 | -1.223 | 0.430 | 1.642 | 22.409 | 1.487 |
| | Image-side surface 52 | -0.596 | 0.071 | | | |
| Fourth lens element 6 | Object-side surface 61 | 1.593 | 0.202 | 1.545 | 55.987 | -1.600 |
| | Image-side surface 62 | 0.533 | 0.824 | | | |
| Filter 9 | Object-side surface 91 | Infinity | 0.400 | 1.523 | 54.512 | |
| | Image-side surface 92 | Infinity | 0.300 | | | |
| | Image plane 100 | Infinity | | | | |

FIG. 28

| Surface | K | $a_4$ | $a_6$ | $a_8$ | $a_{10}$ |
|---|---|---|---|---|---|
| 31 | -1.764179E+00 | 3.208586E-02 | -1.231554E-01 | -1.116190E-01 | 8.467222E-01 |
| 32 | -7.783910E+01 | -1.155062E-01 | -2.840704E-01 | 4.977095E-01 | -1.639046E+00 |
| 41 | 2.337497E-01 | -3.227078E-01 | -1.504247E-02 | -5.018323E-01 | 1.590656E+00 |
| 42 | 1.554221E+00 | -2.991693E-01 | 2.226060E-01 | -1.691878E-01 | 1.942408E-01 |
| 51 | -2.360249E-01 | -2.501788E-02 | 2.397208E-01 | 2.390847E-01 | -2.215948E-01 |
| 52 | -3.750815E+00 | -2.103382E-01 | 2.240621E-01 | 9.352631E-02 | 2.564649E-02 |
| 61 | -7.596287E+00 | -1.484146E-01 | 5.287549E-02 | -1.764511E-02 | 4.760041E-03 |
| 62 | -5.800364E+00 | -1.114155E-01 | 4.843850E-02 | -1.831055E-02 | 3.584835E-03 |
| Surface | $a_{12}$ | $a_{14}$ | $a_{16}$ | | |
| 31 | -3.606105E+00 | 7.525593E+00 | -8.001420E+00 | | |
| 32 | 8.635056E-01 | 2.379981E+00 | -3.570164E+00 | | |
| 41 | -2.644534E+00 | 4.508217E+00 | -3.993928E+00 | | |
| 42 | 8.527097E-02 | -2.680043E-01 | 1.084811E-01 | | |
| 51 | -2.281896E-01 | 1.131466E-01 | 1.249996E-01 | | |
| 52 | -4.866888E-02 | -4.769309E-03 | 2.506667E-02 | | |
| 61 | -3.051695E-05 | 7.081601E-04 | -3.043420E-04 | | |
| 62 | 2.370589E-04 | -2.802062E-04 | 4.102918E-05 | | |

FIG. 29

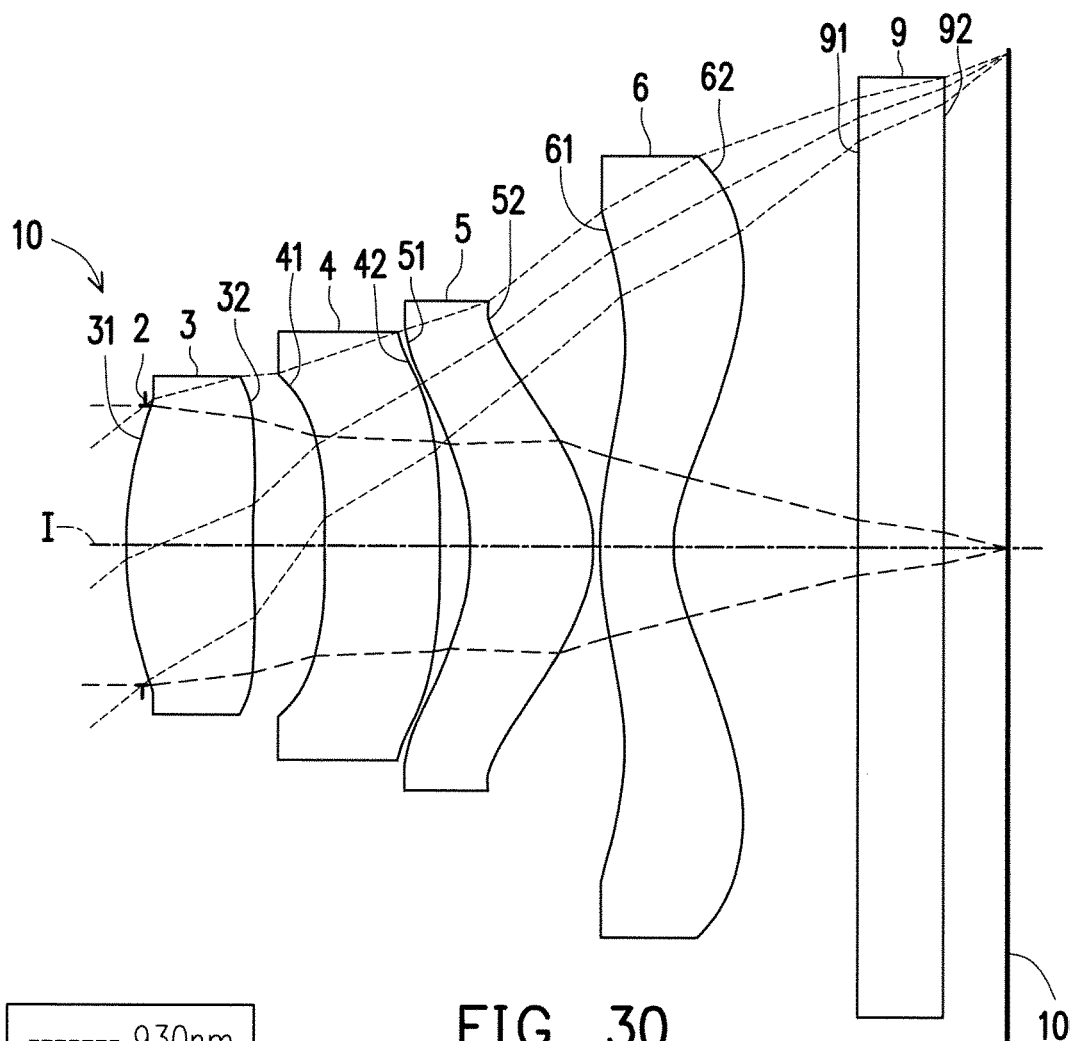
FIG. 30
- - - - - 930nm
——— 940nm
- · - · - 950nm
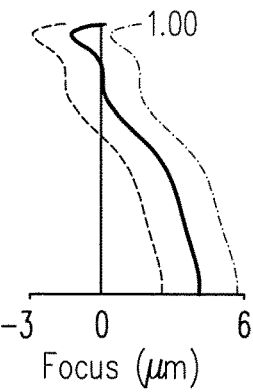
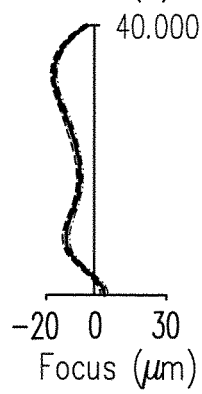
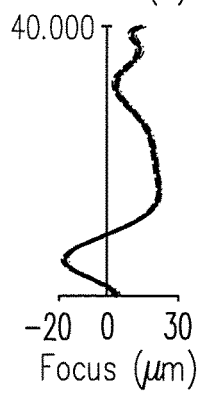
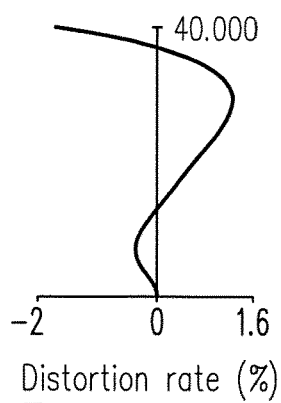
FIG. 31A    FIG. 31B    FIG. 31C    FIG. 31D

| Seventh embodiment ||||||
| --- | --- | --- | --- | --- | --- |
| Effective focal length=2.752 mm , Half field of view=40.000°, f-number=2.151, System length=4.012 mm, Image height=2.275 mm ||||||
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 1.770 | 0.579 | 1.642 | 22.409 | 3.394 |
| | Image-side surface 32 | 9.805 | 0.322 | | | |
| Second lens element 4 | Object-side surface 41 | -5.804 | 0.524 | 1.642 | 22.409 | -586.466 |
| | Image-side surface 42 | -6.102 | 0.137 | | | |
| Third lens element 5 | Object-side surface 51 | -1.187 | 0.561 | 1.642 | 22.409 | 1.650 |
| | Image-side surface 52 | -0.648 | 0.030 | | | |
| Fourth lens element 6 | Object-side surface 61 | 1.727 | 0.334 | 1.545 | 55.987 | -1.944 |
| | Image-side surface 62 | 0.606 | 0.825 | | | |
| Filter 9 | Object-side surface 91 | Infinity | 0.400 | 1.523 | 54.512 | |
| | Image-side surface 92 | Infinity | 0.300 | | | |
| | Image plane 100 | Infinity | | | | |

FIG. 32

| Surface | K | $a_4$ | $a_6$ | $a_8$ | $a_{10}$ |
|---|---|---|---|---|---|
| 31 | -2.180393E+00 | 1.966232E-02 | -3.332032E-02 | -1.161856E-01 | 7.340832E-01 |
| 32 | 6.949169E+00 | -1.230377E-01 | -2.812793E-01 | 5.379152E-01 | -1.346699E+00 |
| 41 | -4.659213E+00 | -3.167865E-01 | 4.968386E-02 | -9.556175E-01 | 1.148088E+00 |
| 42 | -2.477284E+01 | -2.581271E-01 | 1.958251E-01 | -2.150193E-01 | 1.967205E-01 |
| 51 | -1.983849E-01 | -3.532484E-02 | 2.575389E-01 | 2.558033E-01 | -2.364232E-01 |
| 52 | -3.521270E+00 | -2.636180E-01 | 1.916626E-01 | 6.807692E-02 | 6.889191E-03 |
| 61 | -5.831984E+00 | -1.502292E-01 | 5.328112E-02 | -1.811642E-02 | 3.976166E-03 |
| 62 | -5.188763E+00 | -1.082931E-01 | 4.654903E-02 | -1.888338E-02 | 3.520005E-03 |
| Surface | $a_{12}$ | $a_{14}$ | $a_{16}$ | | |
| 31 | -3.510097E+00 | 7.127347E+00 | -5.789505E+00 | | |
| 32 | 7.597617E-01 | 1.193879E+00 | -1.359791E+00 | | |
| 41 | -2.134026E+00 | 5.668952E+00 | -4.088049E+00 | | |
| 42 | 6.028402E-02 | -2.755250E-01 | 1.785362E-01 | | |
| 51 | -2.091110E-01 | 1.243152E-01 | 5.592794E-02 | | |
| 52 | -5.384136E-02 | -5.219154E-03 | 1.561315E-02 | | |
| 61 | -6.514899E-04 | 5.137805E-04 | -1.166845E-04 | | |
| 62 | 2.623356E-04 | -2.622924E-04 | 3.386723E-05 | | |

FIG. 33

| Eighth embodiment ||||||
|---|---|---|---|---|---|
| Effective focal length=2.700 mm , Half field of view=41.000°, f-number=2.111, System length=3.950 mm, Image height=2.275 mm ||||||
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 1.836 | 0.443 | 1.642 | 22.409 | 3.618 |
| | Image-side surface 32 | 9.230 | 0.442 | | | |
| Second lens element 4 | Object-side surface 41 | -4.692 | 0.395 | 1.642 | 22.409 | 41.930 |
| | Image-side surface 42 | -4.102 | 0.187 | | | |
| Third lens element 5 | Object-side surface 51 | -1.246 | 0.494 | 1.642 | 22.409 | 2.505 |
| | Image-side surface 52 | -0.796 | 0.089 | | | |
| Fourth lens element 6 | Object-side surface 61 | 2.496 | 0.519 | 1.545 | 55.987 | -3.006 |
| | Image-side surface 62 | 0.908 | 0.681 | | | |
| Filter 9 | Object-side surface 91 | Infinity | 0.400 | 1.523 | 54.512 | |
| | Image-side surface 92 | Infinity | 0.300 | | | |
| | Image plane 100 | Infinity | | | | |

FIG. 36

| Surface | K | $a_4$ | $a_6$ | $a_8$ | $a_{10}$ |
|---|---|---|---|---|---|
| 31 | -2.942589E+00 | 2.009939E-02 | -3.574287E-02 | -1.950848E-01 | 8.013862E-01 |
| 32 | 9.160231E+01 | -9.959316E-02 | -2.942931E-01 | 7.030734E-01 | -1.594828E+00 |
| 41 | 2.657094E+00 | -3.288498E-01 | 9.156645E-02 | -8.805775E-01 | 1.296576E+00 |
| 42 | 1.680072E+00 | -2.917776E-01 | 1.593200E-01 | -2.094195E-01 | 1.773469E-01 |
| 51 | -1.153983E-01 | -3.631871E-02 | 2.395514E-01 | 2.361197E-01 | -2.209553E-01 |
| 52 | -3.039680E+00 | -2.284416E-01 | 1.988115E-01 | 6.597786E-02 | 3.059833E-03 |
| 61 | -5.494534E+00 | -1.451849E-01 | 5.501220E-02 | -1.758140E-02 | 3.903509E-03 |
| 62 | -5.522042E+00 | -1.010738E-01 | 4.678120E-02 | -1.899130E-02 | 3.464845E-03 |
| Surface | $a_{12}$ | $a_{14}$ | $a_{16}$ | | |
| 31 | -3.484088E+00 | 7.723769E+00 | -7.180320E+00 | | |
| 32 | 5.902148E-01 | 2.175194E+00 | -2.672354E+00 | | |
| 41 | -2.484862E+00 | 5.067129E+00 | -3.927352E+00 | | |
| 42 | 4.830749E-02 | -2.987914E-01 | 1.774059E-01 | | |
| 51 | -2.030118E-01 | 1.229208E-01 | 3.640432E-02 | | |
| 52 | -6.049575E-02 | -8.035672E-03 | 2.010922E-02 | | |
| 61 | -7.607557E-04 | 4.704519E-04 | -9.864586E-05 | | |
| 62 | 2.819695E-04 | -2.508232E-04 | 3.062607E-05 | | |

FIG. 37

| Ninth embodiment | | | | | | |
|---|---|---|---|---|---|---|
| Effective focal length=2.525 mm , Half field of view=41.309°, f-number=2.200, System length=3.689 mm, Image height=2.275 mm | | | | | | |
| Lens element | Surface | Radius of curvature (mm) | Thickness (mm) | Index of refraction | Abbe number | Focal length (mm) |
| Object | | | Infinity | | | |
| First lens element 3 | Object-side surface 31 | 1.938 | 0.444 | 1.642 | 22.409 | 3.366 |
| | Image-side surface 32 | 25.163 | 0.042 | | | |
| Aperture stop 2 | | | 0.350 | | | |
| Second lens element 4 | Object-side surface 41 | -10.561 | 0.369 | 1.642 | 22.409 | 14.747 |
| | Image-side surface 42 | -4.962 | 0.236 | | | |
| Third lens element 5 | Object-side surface 51 | -1.337 | 0.608 | 1.642 | 22.409 | 1.661 |
| | Image-side surface 52 | -0.682 | 0.050 | | | |
| Fourth lens element 6 | Object-side surface 61 | 1.894 | 0.344 | 1.545 | 55.987 | -1.731 |
| | Image-side surface 62 | 0.583 | 0.546 | | | |
| Filter 9 | Object-side surface 91 | Infinity | 0.400 | 1.523 | 54.512 | |
| | Image-side surface 92 | Infinity | 0.300 | | | |
| | Image plane 100 | Infinity | | | | |

FIG. 40

| Surface | K | $a_4$ | $a_6$ | $a_8$ | $a_{10}$ |
|---|---|---|---|---|---|
| 31 | -4.842311E+00 | 6.140336E-03 | -4.151058E-02 | -1.737428E-01 | 7.255338E-01 |
| 32 | -1.835947E+02 | -1.086494E-01 | -3.177123E-01 | 7.199759E-01 | -1.441874E+00 |
| 41 | -1.796329E+02 | -2.931409E-01 | 1.283197E-01 | -8.696844E-01 | 1.544551E+00 |
| 42 | -4.407425E+01 | -2.742878E-01 | 1.590126E-01 | -1.944089E-01 | 2.190879E-01 |
| 51 | -1.109719E-01 | -4.149860E-02 | 2.378655E-01 | 2.268143E-01 | -2.400349E-01 |
| 52 | -3.701699E+00 | -2.341749E-01 | 2.014246E-01 | 6.543675E-02 | 6.608644E-04 |
| 61 | -1.099430E+01 | -1.294472E-01 | 4.438140E-02 | -2.321930E-02 | 3.322028E-03 |
| 62 | -4.867694E+00 | -9.153609E-02 | 4.016590E-02 | -1.816634E-02 | 3.549035E-03 |
| Surface | $a_{12}$ | $a_{14}$ | $a_{16}$ | | |
| 31 | -3.819512E+00 | 7.361641E+00 | -4.915181E+00 | | |
| 32 | 1.151669E+00 | 3.116853E+00 | -7.094023E+00 | | |
| 41 | -1.723545E+00 | 5.955072E+00 | -5.564705E+00 | | |
| 42 | 1.050405E-01 | -2.386654E-01 | 2.452514E-01 | | |
| 51 | -2.219432E-01 | 1.144384E-01 | 4.127513E-02 | | |
| 52 | -6.286406E-02 | -1.015733E-02 | 1.821088E-02 | | |
| 61 | -3.653698E-04 | 6.907759E-04 | -1.417852E-04 | | |
| 62 | 2.425539E-04 | -2.701533E-04 | 3.347302E-05 | | |

FIG. 41

| Tenth embodiment ||||||
|---|---|---|---|---|---|
| Effective focal length=2.402 mm , Half field of view=40.352°, f-number=1.878, System length=3.532 mm, Image height=2.275 mm ||||||
| Lens element | Surface | Radius of curvature (mm) | Thickness (mm) | Index of refraction | Abbe number | Focal length (mm) |
| Object | | | Infinity | | | |
| Aperture stop 2 | | | -0.079 | | | |
| First lens element 3 | Object-side surface 31 | 1.618 | 0.321 | 1.642 | 22.409 | 3.167 |
| | Image-side surface 32 | 8.547 | 0.233 | | | |
| Second lens element 4 | Object-side surface 41 | -2.196 | 0.353 | 1.642 | 22.409 | 33.669 |
| | Image-side surface 42 | -2.109 | 0.163 | | | |
| Third lens element 5 | Object-side surface 51 | -1.221 | 0.442 | 1.642 | 22.409 | 1.467 |
| | Image-side surface 52 | -0.593 | 0.107 | | | |
| Fourth lens element 6 | Object-side surface 61 | 1.316 | 0.149 | 1.545 | 55.987 | -1.705 |
| | Image-side surface 62 | 0.518 | 1.063 | | | |
| Filter 9 | Object-side surface 91 | Infinity | 0.400 | 1.523 | 54.512 | |
| | Image-side surface 92 | Infinity | 0.300 | | | |
| | Image plane 100 | Infinity | | | | |

FIG. 44

| Surface | K | $a_4$ | $a_6$ | $a_8$ | $a_{10}$ |
|---|---|---|---|---|---|
| 31 | -3.761877E+00 | 6.040952E-03 | -1.046598E-01 | -2.093456E-01 | 5.863259E-01 |
| 32 | -1.751908E+02 | -1.458657E-01 | -4.071150E-01 | 4.463532E-01 | -1.600932E+00 |
| 41 | 5.182215E-02 | -3.216550E-01 | 4.335512E-02 | -4.913247E-01 | 1.534017E+00 |
| 42 | 1.204012E+00 | -2.721764E-01 | 2.312535E-01 | -1.797392E-01 | 1.504627E-01 |
| 51 | -2.238634E-01 | -2.739235E-02 | 2.191695E-01 | 2.369012E-01 | -2.141267E-01 |
| 52 | -4.644046E+00 | -2.459158E-01 | 2.531567E-01 | 1.154509E-01 | 2.502684E-02 |
| 61 | -4.747070E+00 | -1.577150E-01 | 5.315610E-02 | -1.735723E-02 | 4.908891E-03 |
| 62 | -4.588770E+00 | -1.090206E-01 | 4.545124E-02 | -1.823951E-02 | 3.884771E-03 |
| Surface | $a_{12}$ | $a_{14}$ | $a_{16}$ | | |
| 31 | -3.996415E+00 | 7.226238E+00 | -8.209985E+00 | | |
| 32 | 9.015494E-01 | 2.379005E+00 | -3.980240E+00 | | |
| 41 | -2.661607E+00 | 4.627375E+00 | -3.718140E+00 | | |
| 42 | 1.276919E-02 | -2.779589E-01 | 5.643225E-02 | | |
| 51 | -2.065192E-01 | 1.126279E-01 | 1.033946E-01 | | |
| 52 | -5.336588E-02 | -1.171314E-02 | 3.320885E-02 | | |
| 61 | 6.047317E-05 | 7.094764E-04 | -3.463691E-04 | | |
| 62 | 2.824923E-04 | -2.546862E-04 | 2.220036E-05 | | |

FIG. 45

| Conditional expression | First embodiment | Second embodiment | Third embodiment | Fourth embodiment | Fifth embodiment |
|---|---|---|---|---|---|
| T1 | 0.527 | 0.456 | 0.473 | 0.508 | 0.511 |
| G12 | 0.338 | 0.342 | 0.723 | 0.389 | 0.375 |
| T2 | 0.489 | 0.753 | 0.394 | 0.423 | 0.453 |
| G23 | 0.150 | 0.105 | 0.059 | 0.131 | 0.152 |
| T3 | 0.645 | 0.618 | 0.493 | 1.160 | 0.621 |
| G34 | 0.024 | 0.011 | 0.011 | 0.014 | 0.061 |
| T4 | 0.433 | 0.294 | 0.593 | 0.321 | 0.323 |
| G4F | 0.782 | 0.528 | 0.496 | 0.659 | 0.806 |
| TF | 0.400 | 0.400 | 0.400 | 0.400 | 0.400 |
| GFP | 0.300 | 0.255 | 0.300 | 0.222 | 0.300 |
| AAG | 0.512 | 0.459 | 0.792 | 0.534 | 0.588 |
| ALT | 2.094 | 2.121 | 1.953 | 2.412 | 1.909 |
| BFL | 1.482 | 1.183 | 1.196 | 1.281 | 1.506 |
| TTL | 4.088 | 3.763 | 3.941 | 4.227 | 4.003 |
| TL | 2.606 | 2.580 | 2.745 | 2.946 | 2.497 |
| EFL | 2.759 | 2.355 | 2.603 | 2.681 | 2.755 |
| V1 | 22.409 | 22.409 | 22.409 | 22.409 | 20.412 |
| V2 | 22.409 | 22.409 | 22.409 | 22.409 | 22.409 |
| V3 | 22.409 | 22.409 | 22.409 | 22.409 | 22.409 |
| V4 | 55.987 | 55.987 | 55.987 | 55.987 | 55.987 |

FIG. 46

| Conditional expression | First embodiment | Second embodiment | Third embodiment | Fourth embodiment | Fifth embodiment |
|---|---|---|---|---|---|
| V4-V1 | 33.578 | 33.578 | 33.578 | 33.578 | 35.575 |
| T2/G12 | 1.448 | 2.200 | 0.545 | 1.087 | 1.208 |
| (G23+G34+T4)/G12 | 1.800 | 1.200 | 0.916 | 1.197 | 1.427 |
| ALT/G12 | 6.200 | 6.199 | 2.702 | 6.200 | 5.086 |
| BFL/T3 | 2.298 | 1.915 | 2.427 | 1.104 | 2.424 |
| BFL/AAG | 2.893 | 2.578 | 1.509 | 2.400 | 2.561 |
| TL/BFL | 1.759 | 2.180 | 2.296 | 2.299 | 1.658 |
| TTL/T1 | 7.763 | 8.246 | 8.326 | 8.322 | 7.831 |
| TTL/T2 | 8.359 | 5.000 | 10.000 | 9.999 | 8.827 |
| TTL/T3 | 6.339 | 6.089 | 8.000 | 3.643 | 6.443 |
| TTL/AAG | 7.980 | 8.200 | 4.973 | 7.919 | 6.808 |
| EFL/T2 | 5.642 | 3.130 | 6.603 | 6.341 | 6.075 |
| EFL/T3 | 4.278 | 3.811 | 5.283 | 2.310 | 4.434 |
| EFL/ALT | 1.318 | 1.111 | 1.333 | 1.111 | 1.443 |
| AAG/(G23+G34+T4) | 0.843 | 1.118 | 1.197 | 1.146 | 1.098 |
| TL/ALT | 1.245 | 1.216 | 1.406 | 1.221 | 1.308 |
| (G23+G34+T4)/T1 | 1.154 | 0.900 | 1.399 | 0.917 | 1.048 |
| TL/T1 | 4.949 | 5.653 | 5.799 | 5.800 | 4.885 |
| AAG/G12 | 1.517 | 1.341 | 1.096 | 1.372 | 1.566 |

FIG. 47

| Conditional expression | Sixth embodiment | Seventh embodiment | Eighth embodiment | Ninth embodiment | Tenth embodiment |
|---|---|---|---|---|---|
| T1 | 0.447 | 0.579 | 0.443 | 0.444 | 0.321 |
| G12 | 0.282 | 0.322 | 0.442 | 0.392 | 0.233 |
| T2 | 0.357 | 0.524 | 0.395 | 0.369 | 0.353 |
| G23 | 0.129 | 0.137 | 0.187 | 0.236 | 0.163 |
| T3 | 0.430 | 0.561 | 0.494 | 0.608 | 0.442 |
| G34 | 0.071 | 0.030 | 0.089 | 0.050 | 0.107 |
| T4 | 0.202 | 0.334 | 0.519 | 0.344 | 0.149 |
| G4F | 0.824 | 0.825 | 0.681 | 0.546 | 1.063 |
| TF | 0.400 | 0.400 | 0.400 | 0.400 | 0.400 |
| GFP | 0.300 | 0.300 | 0.300 | 0.300 | 0.300 |
| AAG | 0.481 | 0.490 | 0.718 | 0.678 | 0.504 |
| ALT | 1.436 | 1.997 | 1.851 | 1.765 | 1.265 |
| BFL | 1.524 | 1.525 | 1.381 | 1.246 | 1.763 |
| TTL | 3.441 | 4.012 | 3.950 | 3.690 | 3.532 |
| TL | 1.917 | 2.486 | 2.569 | 2.443 | 1.769 |
| EFL | 2.679 | 2.752 | 2.700 | 2.525 | 2.402 |
| V1 | 22.409 | 22.409 | 22.409 | 22.409 | 22.409 |
| V2 | 22.409 | 22.409 | 22.409 | 22.409 | 22.409 |
| V3 | 22.409 | 22.409 | 22.409 | 22.409 | 22.409 |
| V4 | 55.987 | 55.987 | 55.987 | 55.987 | 55.987 |

FIG. 48

| Conditional expression | Sixth embodiment | Seventh embodiment | Eighth embodiment | Ninth embodiment | Tenth embodiment |
|---|---|---|---|---|---|
| V4-V1 | 33.578 | 33.578 | 33.578 | 33.578 | 33.578 |
| T2/G12 | 1.264 | 1.627 | 0.894 | 0.941 | 1.514 |
| (G23+G34+T4)/G12 | 1.421 | 1.556 | 1.799 | 1.606 | 1.800 |
| ALT/G12 | 5.087 | 6.200 | 4.187 | 4.503 | 5.424 |
| BFL/T3 | 3.542 | 2.721 | 2.797 | 2.050 | 3.993 |
| BFL/AAG | 3.166 | 3.116 | 1.922 | 1.838 | 3.500 |
| TL/BFL | 1.258 | 1.630 | 1.861 | 1.960 | 1.003 |
| TTL/T1 | 7.703 | 6.932 | 8.916 | 8.301 | 10.999 |
| TTL/T2 | 9.644 | 7.656 | 9.999 | 10.000 | 10.000 |
| TTL/T3 | 7.999 | 7.157 | 8.000 | 6.068 | 8.000 |
| TTL/AAG | 7.149 | 8.195 | 5.498 | 5.441 | 7.011 |
| EFL/T2 | 7.507 | 5.252 | 6.836 | 6.843 | 6.801 |
| EFL/T3 | 6.227 | 4.910 | 5.469 | 4.153 | 5.441 |
| EFL/ALT | 1.866 | 1.378 | 1.459 | 1.431 | 1.899 |
| AAG/(G23+G34+T4) | 1.200 | 0.977 | 0.903 | 1.077 | 1.200 |
| TL/ALT | 1.335 | 1.245 | 1.388 | 1.384 | 1.398 |
| (G23+G34+T4)/T1 | 0.898 | 0.866 | 1.795 | 1.417 | 1.307 |
| TL/T1 | 4.291 | 4.296 | 5.799 | 5.497 | 5.508 |
| AAG/G12 | 1.705 | 1.520 | 1.625 | 1.730 | 2.160 |

FIG. 49

OPTICAL IMAGING LENS

CROSS-REFERENCE TO RELATED APPLICATION

This application claims the priority benefit of Chinese application serial no. 201710670098.5, filed on Aug. 8, 2017. The entirety of the above-mentioned patent application is hereby incorporated by reference herein and made a part of this specification.

BACKGROUND OF THE INVENTION

Field of the Invention

The invention relates to an optical imaging lens.

Description of Related Art

In recent years, the popularity of mobile products such as mobile phones and digital cameras allowed the rigorous development of imaging module-related techniques, and the imaging module mainly contains elements such as an optical imaging lens, a module holder unit, and a sensor, and the thin and light developing trend of mobile phones and digital cameras also resulted in a greater demand of the compactness of the imaging module. With the advancement of the techniques of charge-coupled device (CCD) and complementary metal oxide semiconductor (CMOS) and reduction in size, the length of the optical imaging lens installed in the imaging module also needs to be correspondingly reduced. However, to prevent reduction in photographic effects and quality, when the length of the optical imaging lens is reduced, good optical performance still needs to be achieved. The most important feature of the optical imaging lens is expectedly imaging quality and size.

Specifications of mobile products (such as mobile phones, cameras, tablet computers, personal digital assistants, automotive video devices, and virtual reality trackers) are ever changing, and the key component thereof, the optical imaging lens, is also being more dynamically developed, and the application not only covers photography and video recording, but also includes, for instance, environmental monitoring and driving records recording, and with the advancement of image sensing techniques, consumer demand for, for instance, imaging quality is also increased. Therefore, the design of the optical imaging lens not only requires good imaging quality and smaller lens space, when driving in an environment of insufficient lighting, increase in the field of view and aperture size and near-infrared detection are also important topics.

However, the optical imaging lens design cannot produce an optical imaging lens having both imaging quality and small size simply by reducing the ratio of, for instance, a lens having good imaging quality, and the design process involves material properties, and actual issues on the production line such as assembly yield also needs to be considered.

The technical difficulty of manufacturing a small lens is significantly greater than that of a traditional lens, and therefore how to manufacture an optical imaging lens satisfying consumer electronic product requirements and continuing to increase the imaging quality thereof have always been highly desired goals of production, government, and academia in the field.

SUMMARY OF THE INVENTION

The invention provides an optical imaging lens capable of maintaining good optical performance under the condition of a reduced lens system length.

An embodiment of the invention provides an optical imaging lens including a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The object-side surface of the second lens element has a concave portion in a vicinity of the optical axis, and the image-side surface of the second lens element has a convex portion in a vicinity of a periphery of the second lens element. The object-side surface of the third lens element has a concave portion in a vicinity of a periphery of the third lens element, and the fourth lens element has negative refracting power. Only the first lens element, the second lens element, the third lens element, and the fourth lens element have refracting power. The optical imaging lens satisfies: $V4-V1 \geq 30$, where V4 is an Abbe number of the fourth lens element, and V1 is an Abbe number of the first lens element.

An embodiment of the invention provides an optical imaging lens including a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The first lens element has positive refracting power. The object-side surface of the second lens element has a concave portion in a vicinity of the optical axis, and the image-side surface of the second lens element has a convex portion in a vicinity of a periphery of the second lens element. The object-side surface of the third lens element has a concave portion in a vicinity of a periphery of the third lens element. The object-side surface of the fourth lens element has a concave portion in a vicinity of a periphery of the fourth lens element. Only the first lens element, the second lens element, the third lens element, and the fourth lens element have refracting power. The optical imaging lens satisfies: $V4-V1 \geq 30$, where V4 is an Abbe number of the fourth lens element, and V1 is an Abbe number of the first lens element.

An embodiment of the invention provides an optical imaging lens including a first lens element, a second lens element, a third lens element, and a fourth lens element from an object side to an image side in order along an optical axis. The first lens element to the fourth lens element each include an object-side surface facing the object side and allowing imaging rays to pass through and an image-side surface facing the image side and allowing the imaging rays to pass through. The object-side surface of the second lens element has a concave portion in a vicinity of the optical axis, and the image-side surface of the second lens element has a convex portion in a vicinity of a periphery of the second lens element. The third lens element has positive refracting power, and the object-side surface of the third lens element has a concave portion in a vicinity of a periphery of the third lens element. The object-side surface of the fourth lens element has a concave portion in a vicinity of a periphery of the fourth lens element. Only the first lens element, the second lens element, the third lens element, and the fourth lens element have refracting power. The optical imaging lens satisfies: V4−V1≥30, where V4 is an Abbe number of the fourth lens element, and V1 is an Abbe number of the first lens element.

Based on the above, the optical imaging lens of the embodiments of the invention has the following beneficial effects: via the concave and convex shape design, arrangement of the object-side surface or the image-side surface of the lens element, and satisfying the aforementioned condition formula, the optical imaging lens still has the optical performance of being capable of overcoming aberrations and provides good imaging quality under the condition of a reduced system length.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic describing the surface structure of a lens element.

FIG. 2 is a schematic describing the surface concave and convex structure and the ray focus of a lens element.

FIG. 3 is a schematic describing the surface structure of the lens element of example 1.

FIG. 4 is a schematic describing the surface structure of the lens element of example 2.

FIG. 5 is a schematic describing the surface structure of the lens element of example 3.

FIG. 8 shows detailed optical data of the optical imaging lens of the first embodiment of the invention.

FIG. 9 shows aspheric surface parameters of the optical imaging lens of the first embodiment of the invention.

FIG. 12 shows detailed optical data of the optical imaging lens of the second embodiment of the invention.

FIG. 13 shows aspheric surface parameters of the optical imaging lens of the second embodiment of the invention.

FIG. 16 shows detailed optical data of the optical imaging lens of the third embodiment of the invention.

FIG. 17 shows aspheric surface parameters of the optical imaging lens of the third embodiment of the invention.

FIG. 20 shows detailed optical data of the optical imaging lens of the fourth embodiment of the invention.

FIG. 21 shows aspheric surface parameters of the optical imaging lens of the fourth embodiment of the invention.

FIG. 24 shows detailed optical data of the optical imaging lens of the fifth embodiment of the invention.

FIG. 25 shows aspheric surface parameters of the optical imaging lens of the fifth embodiment of the invention.

FIG. 28 shows detailed optical data of the optical imaging lens of the sixth embodiment of the invention.

FIG. 29 shows aspheric surface parameters of the optical imaging lens of the sixth embodiment of the invention.

FIG. 30 is a schematic of an optical imaging lens of the seventh embodiment of the invention.

FIG. 31A to FIG. 31D are diagrams of the longitudinal spherical aberration and various aberrations of the optical imaging lens of the seventh embodiment.

FIG. 32 shows detailed optical data of the optical imaging lens of the seventh embodiment of the invention.

FIG. 33 shows aspheric surface parameters of the optical imaging lens of the seventh embodiment of the invention.

FIG. 36 shows detailed optical data of the optical imaging lens of the eighth embodiment of the invention.

FIG. 37 shows aspheric surface parameters of the optical imaging lens of the eighth embodiment of the invention.

FIG. 40 shows detailed optical data of the optical imaging lens of the ninth embodiment of the invention.

FIG. 41 shows aspheric surface parameters of the optical imaging lens of the ninth embodiment of the invention.

FIG. 44 shows detailed optical data of the optical imaging lens of the tenth embodiment of the invention.

FIG. 45 shows aspheric surface parameters of the optical imaging lens of the tenth embodiment of the invention.

FIG. 46 to FIG. 49 show the numeric values of various important parameters and relationship formulas thereof of the optical imaging lens elements of the first to tenth embodiments of the invention.

DESCRIPTION OF THE EMBODIMENTS

Figure 6:
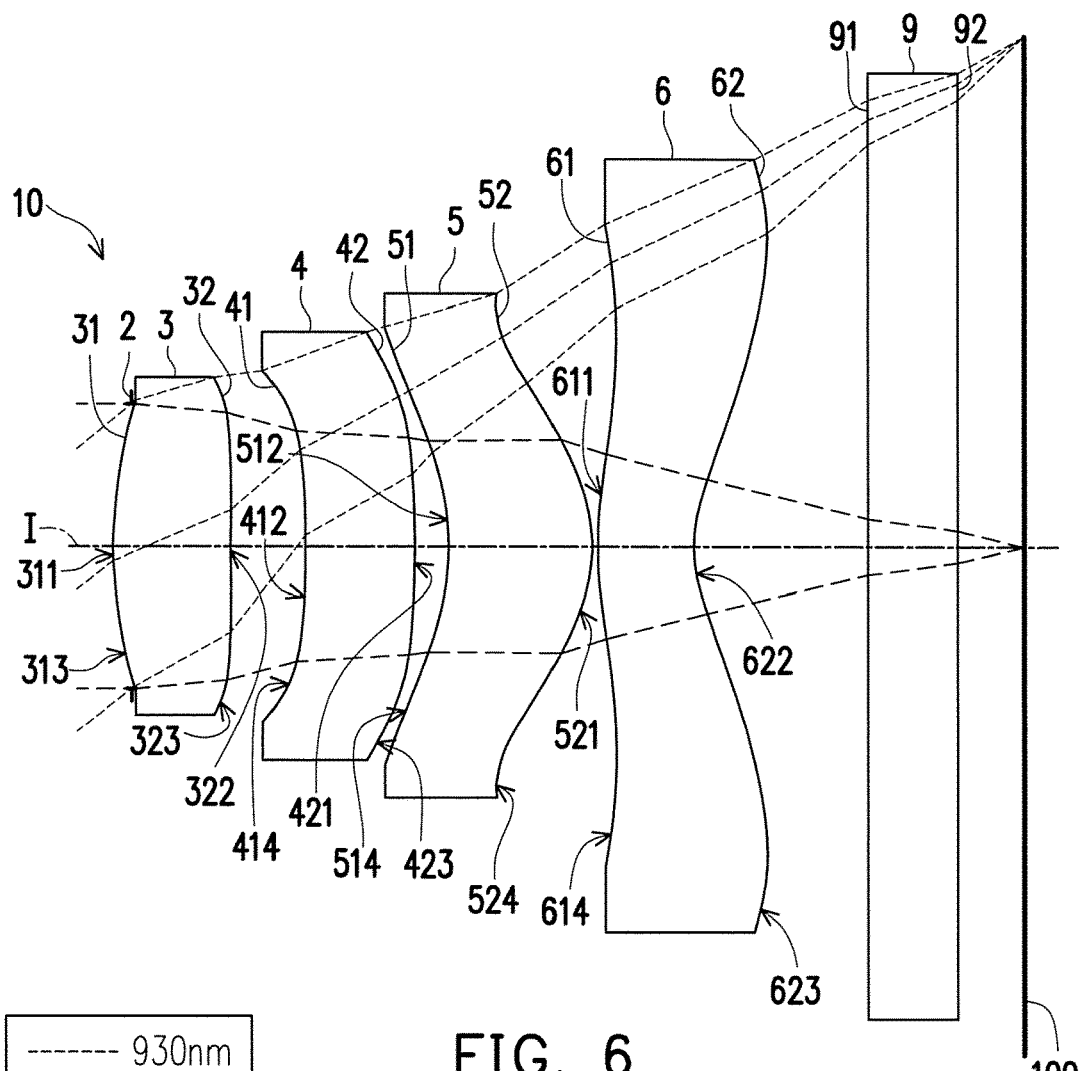
FIG. 6 is a schematic of an optical imaging lens of the first embodiment of the invention.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element", in which "a portion in a vicinity of a periphery of the lens element" means "a periphery region". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens element surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic of an optical imaging lens of the first embodiment of the invention, and FIG. 7A to FIG. 7D are diagrams of the longitudinal spherical aberration and various aberrations of the optical imaging lens of the first embodiment. Referring first to FIG. 6, the optical imaging lens 10 of the first embodiment of the invention includes an aperture stop 2, a first lens element 3, a second lens element 4, a third lens element 5, a fourth lens element 6 and a filter 9 from the object side to the image side in order along an optical axis I of the optical the imaging lens 10. When rays emitted by an object to be photographed enter the optical imaging lens 10 and pass through the aperture stop 2, the first lens element 3, the second lens element 4, the third lens element 5, the fourth lens element 6, and the filter 9, an image is formed on an image plane 100. The filter 9 is, for instance, an infrared (IR) cut-off filter, which is used to prevent a part of infrared rays in the light rays from being transmitted to the image plane 100 thereby affecting the imaging quality. It should be added that, the object side is a side facing the object to be photographed and the image side is a side facing the image plane 100.

The first lens element 3, the second lens element 4, the third lens element 5, the fourth lens 6, and the filter 9 all each have an object-side surface 31, 41, 51, 61, 91 facing the object side and allowing the imaging rays to pass through and an image-side surface 32, 42, 52, 62, 92 facing the image side and allowing the imaging rays to pass through.

Moreover, to meet the demand for a light product, the first lens element 3 to the fourth lens element 6 all have refracting power, and the first lens element 3, the second lens element 4, the third lens element 5, and the fourth lens element 6 are all made of a plastic material, but the materials of the first lens element 3 to the fourth lens element 6 are not limited thereto.

The first lens element 3 has positive refracting power. The object-side surface 31 of the first lens element 3 has a convex portion 311 in a vicinity of the optical axis I and a convex portion 313 in a vicinity of a periphery of the first lens element 3. The image-side surface 32 of the first lens element 3 has a concave portion 322 in a vicinity of the optical axis I and a convex portion 323 in a vicinity of the periphery of the first lens element 3.

The second lens element 4 has positive refracting power. The object-side surface 41 of the second lens element 4 has a concave portion 412 in a vicinity of the optical axis I and a concave portion 414 in a vicinity of a periphery of the second lens element 4. The image-side surface 42 of the second lens element 4 has a convex portion 421 in a vicinity of the optical axis I and a convex portion 423 in a vicinity of a periphery of the second lens element 4.

The third lens element 5 has positive refracting power. The object-side surface 51 of the third lens element 5 has a concave portion 512 in a vicinity of the optical axis I and a concave portion 514 in a vicinity of a periphery of the third lens element 5. The image-side surface 52 of the third lens element 5 has a convex portion 521 in a vicinity of the optical axis I and a concave portion 524 in a vicinity of the periphery of the third lens element 5.

The fourth lens element 6 has negative refracting power. The object-side surface 61 of the fourth lens element 6 has a convex portion 611 in a vicinity of the optical axis I and a concave portion 614 in a vicinity of a periphery of the fourth lens element 6. The image-side surface 62 of the fourth lens element 6 has a concave portion 622 in a vicinity of the optical axis I and a convex portion 623 in a vicinity of the periphery of the fourth lens element 6.

In addition, only the aforementioned lens elements have refracting power, and the quantity of the lens elements having refracting power of the optical imaging lens 10 is only four.

The other detailed optical data of the first embodiment is as shown in FIG. 8, and in the first embodiment, the effective focal length (EFL) of the whole optical imaging lens 10 is 2.759 mm, the half field of view (HFOV) thereof is 38.288°, the f-number (Fno) thereof is 2.157, the system length thereof is 4.088 mm, and the image height thereof is 2.275 mm. In particular, the system length refers to the distance from the object-side surface 31 of the first lens element 3 to the image plane 100 on the optical axis I.

Moreover, in the present embodiment, the eight surfaces of the object-side surfaces 31, 41, 51, and 61 and the image-side surfaces 32, 42, 52, and 62 of the first lens element 3, the second lens element 4, the third lens element 5, and the fourth lens element 6 are all aspheric surfaces, and the aspheric surfaces are defined according to the following general formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i \qquad (1)$$

wherein:

Y: distance between a point on the aspheric surface curve and the optical axis I;

Z: depth (perpendicular distance between the point on the aspheric surface that is spaced by the distance Y from the optical axis I and a tangent plane tangent to the vertex of the aspheric surface on the optical axis I) of the aspheric surface;

R: radius of curvature of the lens element surface in a vicinity of the optical axis I;

K: conic constant;

$a_i$: i-th aspheric surface coefficient.

Each of the aspheric coefficients of the object-side surfaces 31, 41, 51, and 61 and the image-side surfaces 32, 42, 52, and 62 in general formula (1) is as shown in FIG. 9. In particular, column number 31 in FIG. 9 represents the aspheric coefficient of the object-side surface 31 of the first lens element 3, and the other column fields are defined in a similar manner.

Moreover, the relationship between each of the important parameters in the optical imaging lens 10 of the first embodiment is as shown in FIG. 46 and FIG. 47.

wherein,

T1 is the thickness of the first lens element 3 on the optical axis I;

T2 is the thickness of the second lens element 4 on the optical axis I;

T3 is the thickness of the third lens element 5 on the optical axis I;

T4 is the thickness of the fourth lens element 6 on the optical axis I;

TF is the thickness of the filter 9 on the optical axis I;

G12 is the distance from the image-side surface 32 of the first lens element 3 to the object-side surface 41 of the second lens element 4 on the optical axis I, i.e. an air gap from the first lens element 3 to the second lens element 4 on the optical axis I;

G23 is the distance from the image-side surface 42 of the second lens element 4 to the object-side surface 51 of the third lens element 5 on the optical axis I, i.e. an air gap from the second lens element 4 to the third lens element 5 on the optical axis I;

G34 is the distance from the image-side surface 52 of the third lens element 5 to the object-side surface 61 of the fourth lens element 6 on the optical axis I, i.e. an air gap from the third lens element 5 to the fourth lens element 6 on the optical axis I;

G4F is the distance from the image-side surface 62 of the fourth lens element 6 to the object-side surface 91 of the filter 9 on the optical axis I, i.e. an air gap from the fourth lens element 6 to the filter 9 on the optical axis I;

GFP is the distance from the image-side surface 92 of the filter 9 to the image plane 100 on the optical axis I, i.e. an air gap from the filter 9 to the image plane 100 on the optical axis I;

AAG is the sum of three air gaps from the first lens element 3 to the fourth lens element 6 on the optical axis I, i.e., the sum of G12, G23, and G34;

ALT is the sum of the thicknesses of the first lens element 3, the second lens element 4, the third lens element 5, and the fourth lens element 6 on the optical axis I, i.e., the sum of T1, T2, T3, and T4;

TTL is the distance from the object-side surface 31 of the first lens element 3 to the image plane 100 on the optical axis I;

TL is the distance from the object-side surface 31 of the first lens element 3 to the image-side surface 62 of the fourth lens element 6 on the optical axis I;

BFL is the distance from the image-side surface 62 of the fourth lens element 6 to the image plane 100 on the optical axis I; and EFL is the effective focal length of the optical imaging lens 10.

Moreover, the following are further defined:

f1 is the focal length of the first lens element 3;

f2 is the focal length of the second lens element 4;

f3 is the focal length of the third lens element 5;

f4 is the focal length of the fourth lens element 6;

n1 is the index of refraction of the first lens element 3;

n2 is the index of refraction of the second lens element 4;

n3 is the index of refraction of the third lens element 5;

n4 is the index of refraction of the fourth lens element 6;

V1 is the Abbe number of the first lens element 3, and the Abbe number can also be referred to as the coefficient of dispersion;

V2 is the Abbe number of the second lens element 4;

V3 is the Abbe number of the third lens element 5; and

V4 is the Abbe number of the fourth lens element 6.

Figures 7A, 7B, 7C, 7D:
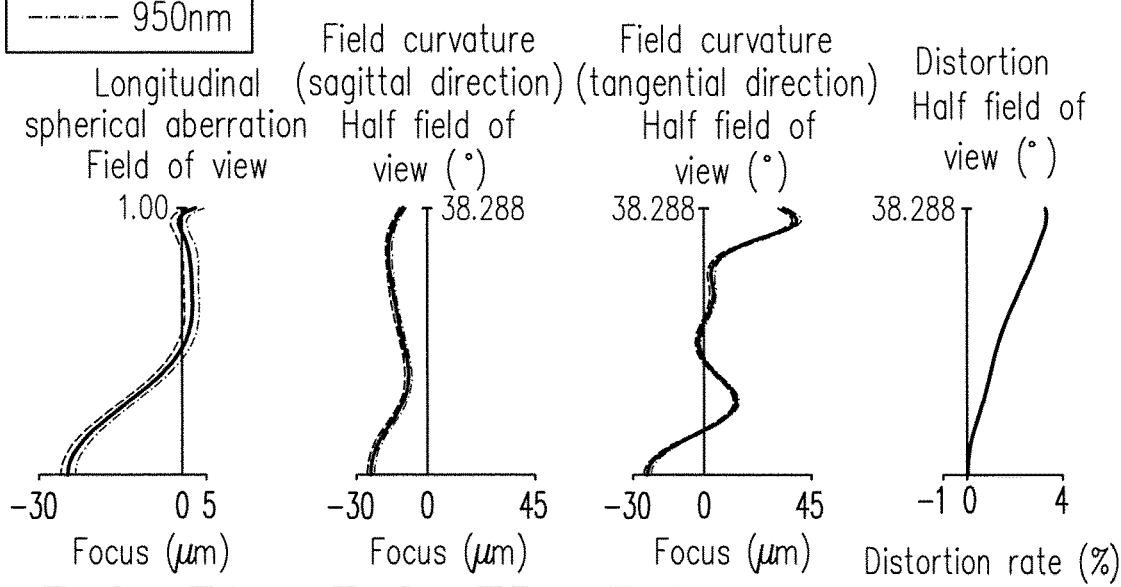
FIG. 7A to FIG. 7D are diagrams of the longitudinal spherical aberration and various aberrations of the optical imaging lens of the first embodiment.

Referring further to FIG. 7A to FIG. 7D, FIG. 7A describes longitudinal spherical aberration of the first embodiment when the pupil radius thereof is 0.6396 mm, FIG. 7B and FIG. 7C respectively describe the field curvature in the sagittal direction and the field curvature in the tangential direction on the image plane 100 of the first embodiment when the wavelengths thereof are 930 nm, 940 nm, and 950 nm, and FIG. 7D describes the distortion aberration on the image plane 100 of the first embodiment when the wavelengths thereof are 930 nm, 940 nm, and 950 nm. In the longitudinal spherical aberration figure of FIG. 7A of the first embodiment, the curves formed by various wavelengths are all very close and are in a vicinity of the center, indicating the off-axis rays at different heights of each wavelength are all concentrated in a vicinity of the imaging point, and it can be seen from the deflection amplitude of the curve of each wavelength that, the imaging point deviation of the off-axis rays at different heights is controlled within the range of ±27 microns, and therefore in the present embodiment, the spherical aberration of the same wavelength is indeed significantly improved. Moreover, the distances between the three representative wavelengths are also relative close, indicating the imaging positions of different wavelength rays are relatively concentrated, and therefore the chromatic aberration is also significantly improved.

In the two field curvature figures of FIG. 7B and FIG. 7C, the focal length variation amount of three representative wavelengths in the entire field of view is within ±42 microns, indicating that the optical system of the first embodiment can effectively eliminate aberrations. The distortion aberration figure of FIG. 7D shows the distortion aberration of the first embodiment is maintained within the range of ±3.5%, indicating the distortion aberration of the first embodiment satisfies the imaging quality requirements of the optical system, and as a result, in comparison to the current optical lens, in the first embodiment, under the condition that the system length is reduced to about 4.088 mm, good imaging quality can still be provided. Therefore, in the first embodiment, under the condition of maintaining good optical performance, the lens length can be reduced and the shooting angle can be expanded to achieve a product design that is thinner and has increased field of view.

Figure 10:
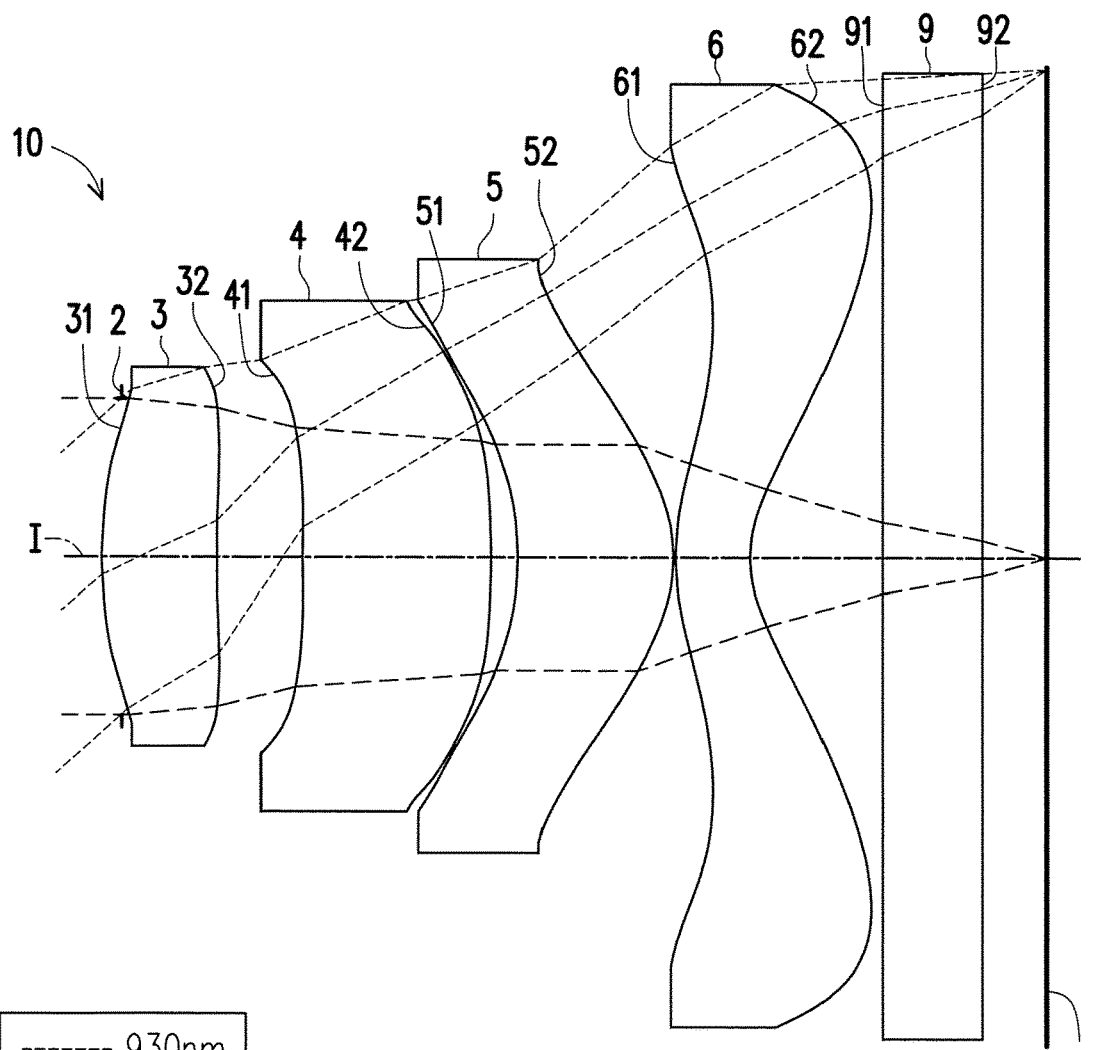
FIG. 10 is a schematic of an optical imaging lens of the second embodiment of the invention.

FIG. 10 is a schematic of an optical imaging lens of the second embodiment of the invention, and FIG. 11A to FIG. 11D are diagrams of the longitudinal spherical aberration and various aberrations of the optical imaging lens of the second embodiment. Referring first to FIG. 10, the second embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. It should be mentioned here that, to clearly show the figure, in FIG. 10, a portion of the reference numerals of the same concave portion and convex portion as the first embodiment is omitted.

The detailed optical data of the optical imaging lens 10 is as shown in FIG. 12, and in the second embodiment, the effective focal length of the whole optical imaging lens 10 is 2.355 mm, the HFOV thereof is 42.524°, the Fno thereof is 1.841, the system length thereof is 3.763 mm, and the image height thereof is 1.974 mm.

FIG. 13 shows each of the aspheric coefficients of the object-side surfaces 31, 41, 51, and 61 and the image-side surfaces 32, 42, 52, and 62 of the second embodiment in general formula (1).

Moreover, the relationship between each of the important parameters in the optical imaging lens 10 of the second embodiment is as shown in FIG. 46 and FIG. 47.

Figures 11A, 11B, 11C, 11D:
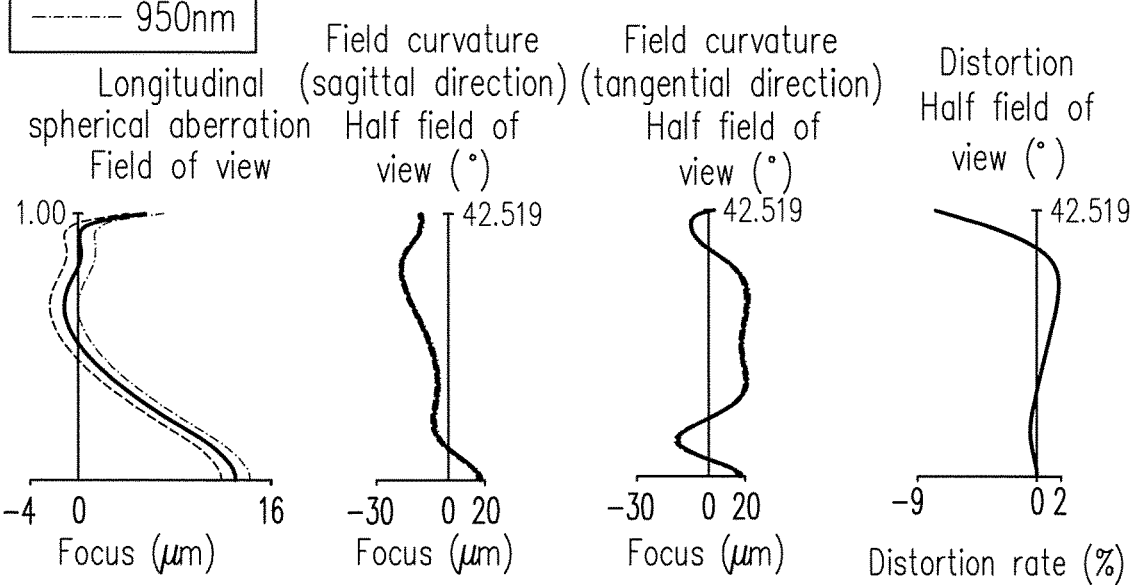
FIG. 11A to FIG. 11D are diagrams of the longitudinal spherical aberration and various aberrations of the optical imaging lens of the second embodiment.

In the longitudinal spherical aberration figure of FIG. 11A of the second embodiment in the condition that the pupil radius thereof is 0.6369 mm, the imaging point deviation of off-axis rays at different heights is controlled to be within the range of ±15 microns. In the two field curvature figures of FIG. 11B and FIG. 11C, the focal length variation amount of three representative wavelengths in the entire field of view is within ±22 microns. The distortion aberration figure of FIG. 11D shows that the distortion aberration of the second embodiment is maintained within the range of ±9%. Accordingly, in comparison to the first embodiment, in the second embodiment, good imaging quality can still be provided under the condition of the system length reduced to about 3.763 mm.

It can be known from the above that, the advantages of the second embodiment in comparison to the first embodiment are: the system length of the second embodiment is less than the system length of the first embodiment, the f-number of the second embodiment is less than that of the first embodiment, the HFOV of the second embodiment is larger than that of the first embodiment, the longitudinal spherical aberration of the second embodiment is less than that of the first embodiment, and the field curvature of the second embodiment is less than that of the first embodiment.

Figure 14:
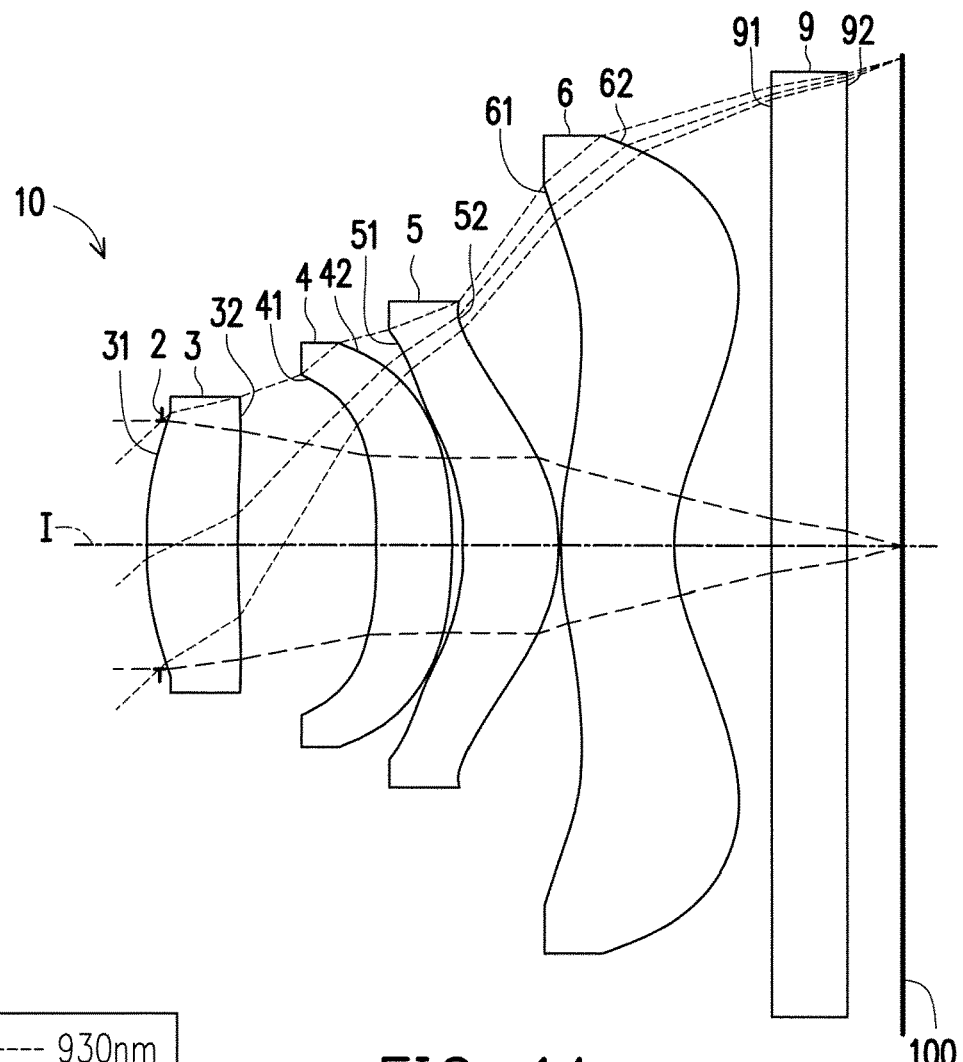
FIG. 14 is a schematic of an optical imaging lens of the third embodiment of the invention.

FIG. 14 is a schematic of an optical imaging lens of the third embodiment of the invention, and FIG. 15A to FIG. 15D are diagrams of the longitudinal spherical aberration and various aberrations of the optical imaging lens of the third embodiment. Referring first to FIG. 14, the third embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. It should be mentioned here that, to clearly show the figure, in FIG. 14, a portion of reference numerals of the same concave portion and convex portion as the first embodiment is omitted.

The detailed optical data of the optical imaging lens 10 is as shown in FIG. 16, and in the third embodiment, the effective focal length of the whole optical imaging lens 10 is 2.603 mm, the HFOV thereof is 42.520°, the Fno thereof is 2.034, the system length thereof is 3.941 mm, and the image height thereof is 2.538 mm.

FIG. 17 shows each of the aspheric coefficients of the object-side surfaces 31, 41, 51, and 61 and the image-side surfaces 32, 42, 52, and 62 of the third embodiment in general formula (1).

Moreover, the relationship between each of the important parameters in the optical imaging lens 10 of the third embodiment is as shown in FIG. 46 and FIG. 47.

Figures 15A, 15B, 15C, 15D:
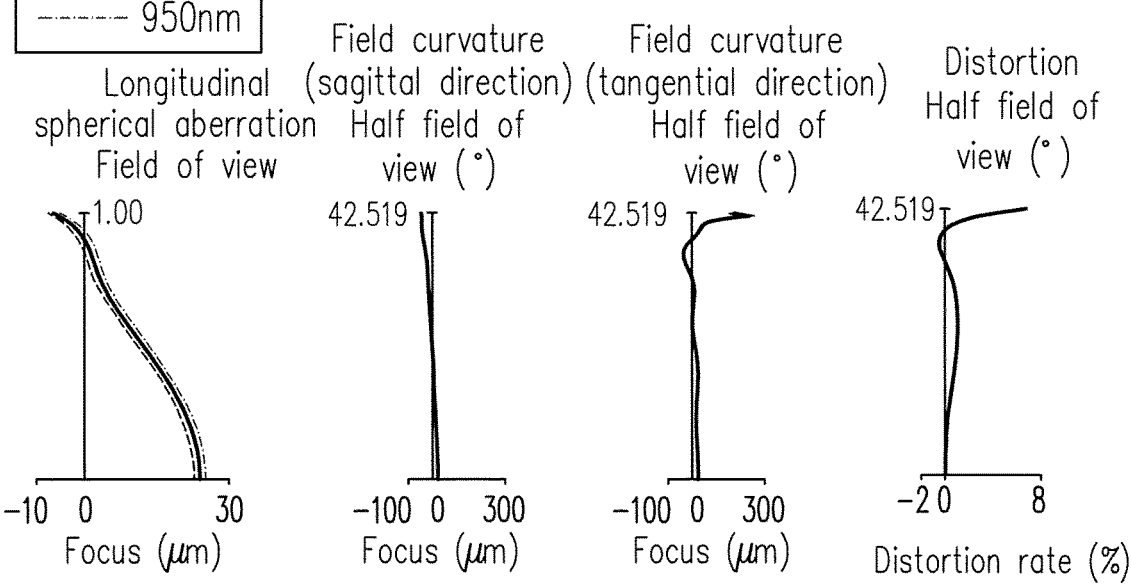
FIG. 15A to FIG. 15D are diagrams of the longitudinal spherical aberration and various aberrations of the optical imaging lens of the third embodiment.

In the longitudinal spherical aberration figure of FIG. 15A of the third embodiment in the condition that the pupil radius thereof is 0.6396 mm, the imaging point deviation of off-axis rays at different heights is controlled to be within the range of ±26 microns. In the two field curvature figures of FIG. 15B and FIG. 15C, the focal length variation amount of three representative wavelengths in the entire field of view is within ±280 microns. The distortion aberration figure of FIG. 15D shows that the distortion aberration of the third embodiment is maintained within the range of ±7%. Accordingly, in comparison to the current optical lens, in the third embodiment, good imaging quality can still be provided under the condition of the system length reduced to about 3.941 mm.

It can be known from the above that, advantages of the third embodiment in comparison to the first embodiment are: the system length of the optical imaging lens 10 of the third embodiment is shorter than that of the first embodiment, the f-number of the third embodiment is less than that of the first embodiment, the HFOV of the third embodiment is larger than that of the first embodiment, the longitudinal spherical aberration of the third embodiment is less than that of the first embodiment, and the third embodiment is easier to manufacture than the first embodiment, and therefore the yield is higher.

Figure 18:
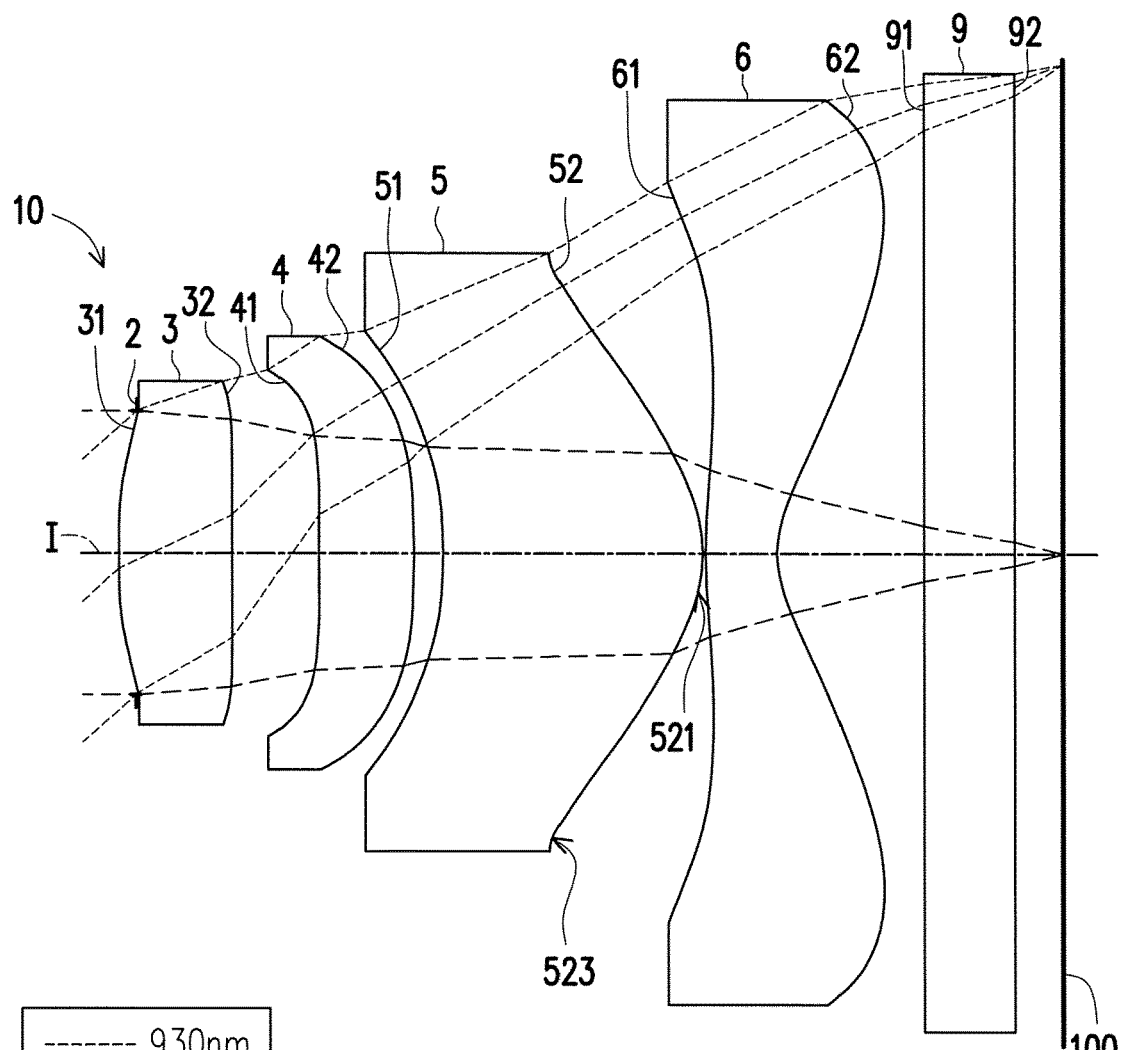
FIG. 18 is a schematic of an optical imaging lens of the fourth embodiment of the invention.

FIG. 18 is a schematic of an optical imaging lens of the fourth embodiment of the invention, and FIG. 19A to FIG. 19D are diagrams of the longitudinal spherical aberration and various aberrations of the optical imaging lens of the fourth embodiment. Referring first to FIG. 18, the fourth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the image-side surface 52 of the third lens element 3 has a convex portion 521 in a vicinity of the optical axis I and a convex portion 523 in a vicinity of a periphery of the third lens element 3. It should be mentioned here that, to clearly show the figure, in FIG. 18, a portion of reference numerals of the same concave portion and convex portion as the first embodiment is omitted.

The detailed optical data of the optical imaging lens 10 is as shown in FIG. 20, and in the fourth embodiment, the effective focal length of the whole optical imaging lens 10 is 2.681 mm, the HFOV thereof is 42.524°, the Fno thereof is 2.095, the system length thereof is 4.227 mm, and the image height thereof is 2.205 mm.

FIG. 21 shows each of the aspheric coefficients of the object-side surfaces 31, 41, 51, and 61 and the image-side surfaces 32, 42, 42, and 62 of the fourth embodiment in general formula (1).

Moreover, the relationship between each of the important parameters in the optical imaging lens 10 of the fourth embodiment is as shown in FIG. 46 and FIG. 47.

Figures 19A, 19B, 19C, 19D:
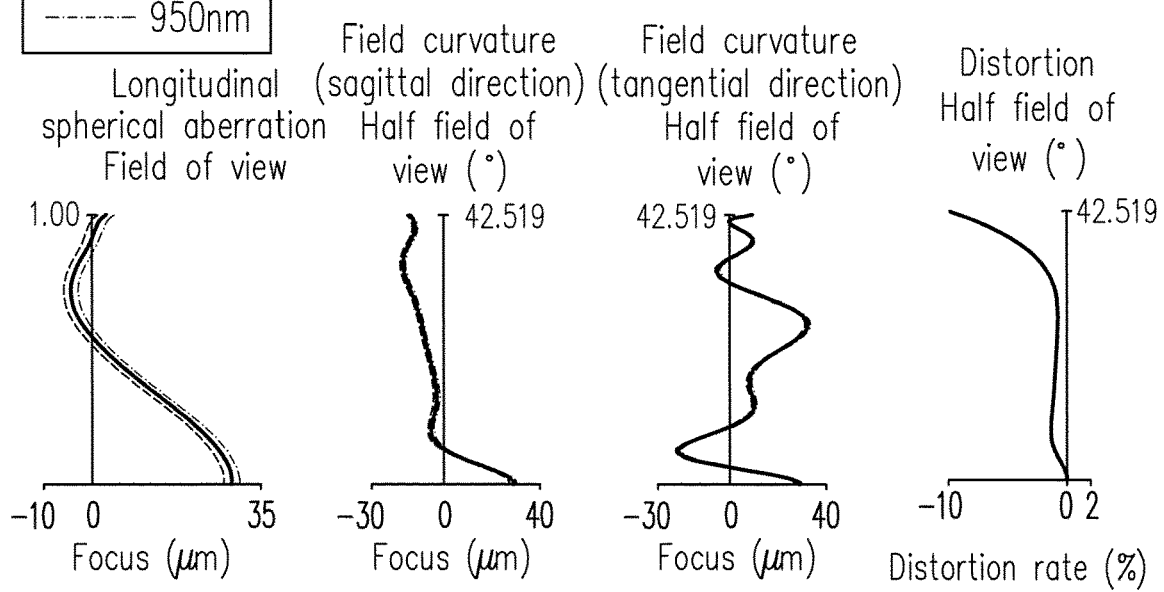
FIG. 19A to FIG. 19D are diagrams of the longitudinal spherical aberration and various aberrations of the optical imaging lens of the fourth embodiment.

In the longitudinal spherical aberration figure of FIG. 19A of the fourth embodiment in the condition that the pupil radius thereof is 0.6396 mm, the imaging point deviation of off-axis rays at different heights is controlled to be within the range of ±32 microns. In the two field curvature figures of FIG. 19B and FIG. 19C, the focal length variation amount of three representative wavelengths in the entire field of view is within ±35 microns. The distortion aberration figure of FIG. 19D shows that the distortion aberration of the fourth embodiment is maintained within the range of ±10%. Accordingly, in comparison to the current optical lens, in the fourth embodiment, good imaging quality can still be provided under the condition of the system length reduced to about 4.227 mm.

It can be known from the above that, the advantages of the fourth embodiment in comparison to the first embodiment are: the f-number of the fourth embodiment is less than that of the first embodiment, the HFOV of the fourth embodiment is larger than that of the first embodiment, and the field curvature of the fourth embodiment is less than that of the first embodiment.

Figure 22:
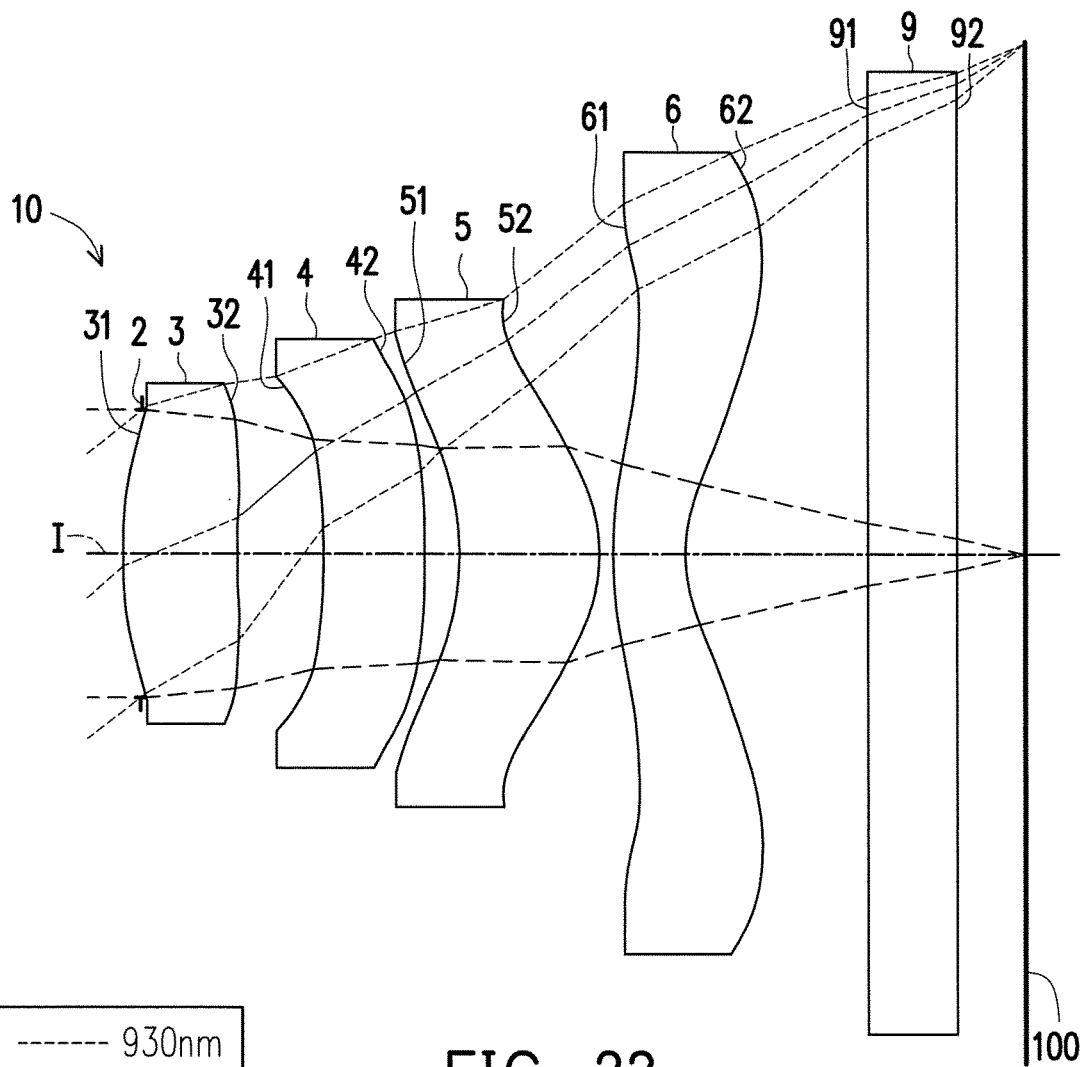
FIG. 22 is a schematic of an optical imaging lens of the fifth embodiment of the invention.

FIG. 22 is a schematic of an optical imaging lens of the fifth embodiment of the invention, and FIG. 23A to FIG. 23D are diagrams of the longitudinal spherical aberration and various aberrations of the optical imaging lens of the fifth embodiment. Referring first to FIG. 22, the fifth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the second lens element 4 has negative refracting power. It should be mentioned here that, to clearly show the figure, in FIG. 22, a portion of reference numerals of the same concave portion and convex portion as the first embodiment is omitted.

The detailed optical data of the optical imaging lens 10 is as shown in FIG. 24, and in the fifth embodiment, the effective focal length of the whole optical imaging lens 10 is 2.755 mm, the HFOV thereof is 38.966°, the Fno thereof is 2.154, the system length thereof is 3.116 mm, and the image height thereof is 2.275 mm.

FIG. 25 shows each of the aspheric coefficients of the object-side surfaces 31, 41, 51, and 61 and the image-side surfaces 32, 42, 52, and 62 of the fifth embodiment in general formula (1).

Moreover, the relationship between each of the important parameters in the optical imaging lens 10 of the fifth embodiment is as shown in FIG. 46 and FIG. 47.

Figures 23A, 23B, 23C, 23D:
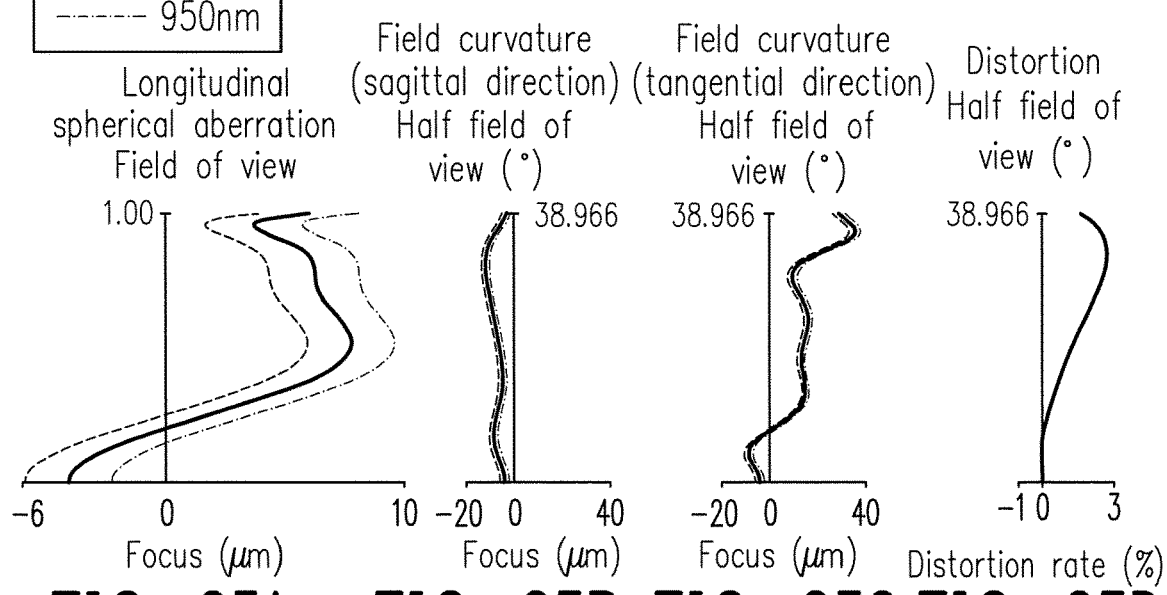
FIG. 23A to FIG. 23D are diagrams of the longitudinal spherical aberration and various aberrations of the optical imaging lens of the fifth embodiment.

In the longitudinal spherical aberration figure of FIG. 23A of the fifth embodiment in the condition that the pupil radius thereof is 0.6396 mm, the imaging point deviation of off-axis rays at different heights is controlled to be within the range of ±9.7 microns. In the two field curvature figures of FIG. 23B and FIG. 23C, the focal length variation amount of three representative wavelengths in the entire field of view is within ±39 microns. The distortion aberration figure of FIG. 23D shows that the distortion aberration of the fifth embodiment is maintained within the range of ±2.8%. Accordingly, in comparison to the current optical lens, in the fifth embodiment, good imaging quality can still be provided under the condition of the system length reduced to about 3.116 mm.

It can be known from the above that, advantages of the fifth embodiment in comparison to the first embodiment are: the system length of the optical imaging lens 10 of the fifth embodiment is shorter than that of the first embodiment, the f-number of the fifth embodiment is less than that of the first embodiment, the HFOV of the fifth embodiment is larger than that of the first embodiment, the longitudinal spherical aberration of the fifth embodiment is less than that of the first embodiment, the field curvature of the fifth embodiment is less than that of the first embodiment, the distortion of the fifth embodiment is less than that of the first embodiment, and the fifth embodiment is easier to manufacture than the first embodiment, and therefore the yield is higher.

Figure 26:
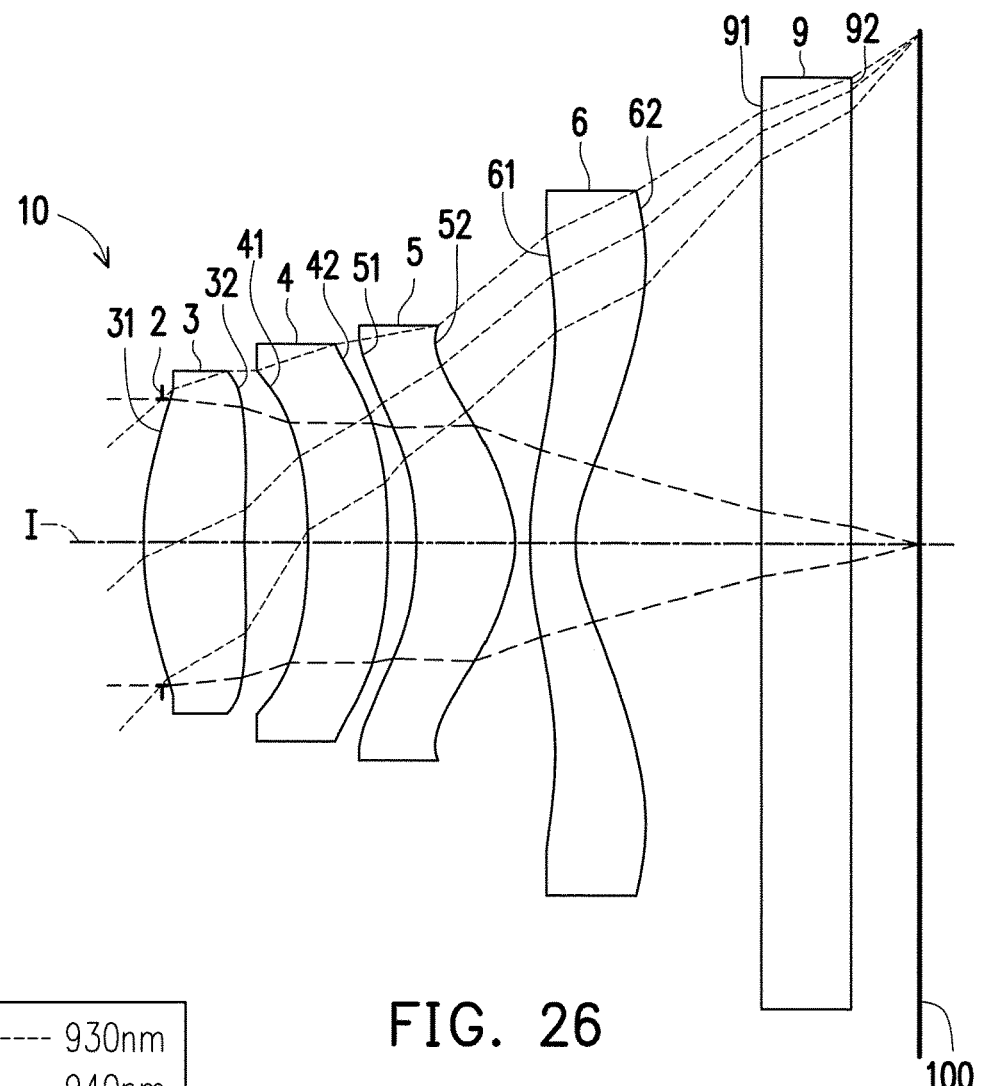
FIG. 26 is a schematic of an optical imaging lens of the sixth embodiment of the invention.

FIG. 26 is a schematic of an optical imaging lens of the sixth embodiment of the invention, and FIG. 27A to FIG. 27D are diagrams of the longitudinal spherical aberration and various aberrations of the optical imaging lens of the sixth embodiment. Referring first to FIG. 26, the sixth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the second lens element 6 has negative refracting power. It should be mentioned here that, to clearly show the figure, in FIG. 26, a portion of reference numerals of the same concave portion and convex portion as the first embodiment is omitted.

The detailed optical data of the optical imaging lens 10 is as shown in FIG. 28, and in the sixth embodiment, the effective focal length of the whole optical imaging lens 10 is 2.679 mm, the HFOV thereof is 41.251°, the Fno thereof is 2.094, the system length thereof is 3.441 mm, and the image height thereof is 2.275 mm.

FIG. 29 shows each of the aspheric coefficients of the object-side surfaces 31, 41, 51, and 61 and the image-side surfaces 32, 42, 52, and 62 of the sixth embodiment in general formula (1).

Moreover, the relationship between each of the important parameters in the optical imaging lens 10 of the sixth embodiment is as shown in FIG. 48 and FIG. 49.

Figures 27A, 27B, 27C, 27D:
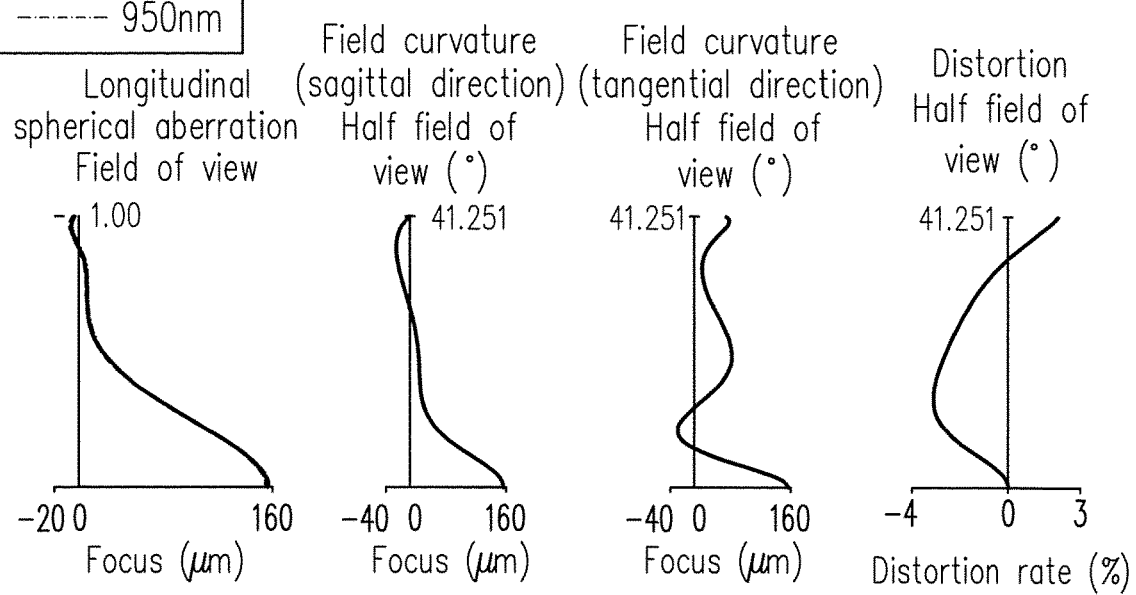
FIG. 27A to FIG. 27D are diagrams of the longitudinal spherical aberration and various aberrations of the optical imaging lens of the sixth embodiment.

In the longitudinal spherical aberration figure of FIG. 27A of the sixth embodiment in the condition that the pupil radius thereof is 0.6369 mm, the imaging point deviation of off-axis rays at different heights is controlled to be within the range of ±160 microns. In the two field curvature figures of FIG. 27B and FIG. 27C, the focal length variation amount of three representative wavelengths in the entire field of view is within ±160 microns. The distortion aberration figure of FIG. 27D shows that the distortion aberration of the sixth embodiment is maintained within the range of ±3.3%. Accordingly, in comparison to the current optical lens, in the sixth embodiment, good imaging quality can still be provided under the condition of the system length reduced to about 3.441 mm.

It can be known from the above that, advantages of the sixth embodiment in comparison to the first embodiment are: the system length of the sixth embodiment is shorter than that of the first embodiment, the f-number of the sixth embodiment is less than that of the first embodiment, the HFOV of the sixth embodiment is larger than that of the first embodiment, and the distortion of the sixth embodiment is less than that of the first embodiment.

FIG. 30 is a schematic of an optical imaging lens of the seventh embodiment of the invention, and FIG. 31A to FIG. 31D are diagrams of the longitudinal spherical aberration and various aberrations of the optical imaging lens of the seventh embodiment. Referring first to FIG. 30, the seventh embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the second lens element 4 has negative refracting power. It should be mentioned here that, to clearly show the figure, in FIG. 30, a portion of reference numerals of the same concave portion and convex portion as the first embodiment is omitted.

The detailed optical data of the optical imaging lens 10 is as shown in FIG. 32, and in the seventh embodiment, the effective focal length of the whole optical imaging lens 10 is 2.752 mm, the HFOV thereof is 40.000°, the Fno thereof is 2.151, the system length thereof is 4.012 mm, and the image height thereof is 2.275 mm.

FIG. 33 shows each of the aspheric coefficients of the object-side surfaces 31, 41, 51, and 61 and the image-side surfaces 32, 42, 52, and 62 of the seventh embodiment in general formula (1).

Moreover, the relationship between each of the important parameters in the optical imaging lens 10 of the seventh embodiment is as shown in FIG. 48 and FIG. 49.

In the longitudinal spherical aberration figure of FIG. 31A of the seventh embodiment in the condition that the pupil radius thereof is 0.6396 mm, the imaging point deviation of off-axis rays at different heights is controlled to be within the range of ±6 microns. In the two field curvature figures of FIG. 31B and FIG. 31C, the focal length variation amount of three representative wavelengths in the entire field of view is within ±25 microns. The distortion aberration figure of FIG. 31D shows that the distortion aberration of the seventh embodiment is maintained within the range of ±1.8%. Accordingly, in comparison to the current optical lens, in the seventh embodiment, good imaging quality can still be provided under the condition of the system length reduced to about 4.012 mm.

It can be known from the above that, the advantages of the seventh embodiment in comparison to the first embodiment are: the system length of the optical imaging lens 10 of the seventh embodiment is less than that of the first embodiment, the f-number of seventh embodiment is less than that of the first embodiment, the HFOV of the seventh embodiment is larger than that of the first embodiment, the longitudinal spherical aberration of the seventh embodiment is less than that of the first embodiment, the field curvature of the seventh embodiment is less than that of the first embodiment, and the distortion of the seventh embodiment is less than that of the first embodiment.

Figure 34:
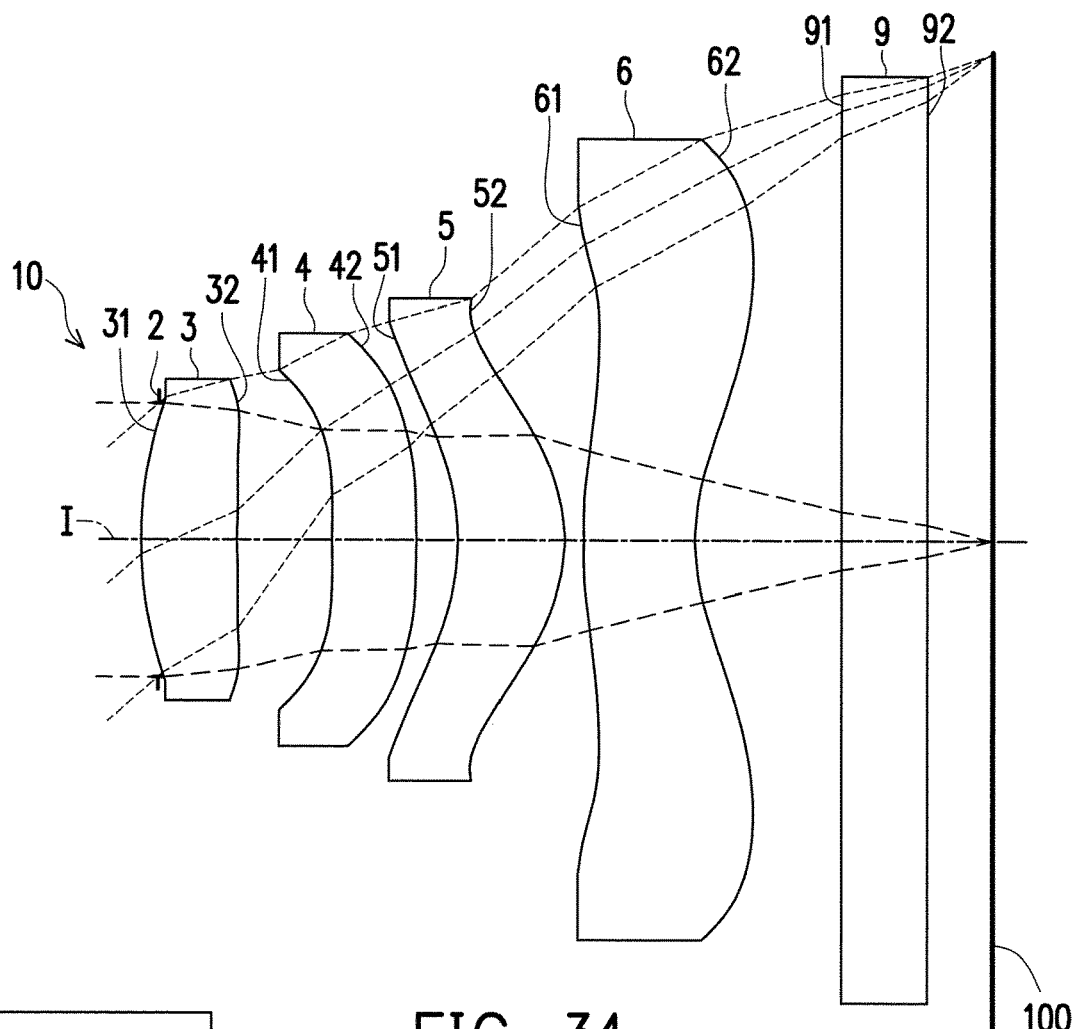
FIG. 34 is a schematic of an optical imaging lens of the eighth embodiment of the invention.

FIG. 34 is a schematic of an optical imaging lens of the eighth embodiment of the invention, and FIG. 35A to FIG. 35D are diagrams of the longitudinal spherical aberration and various aberrations of the optical imaging lens of the eighth embodiment. Referring first to FIG. 34, the eighth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. It should be mentioned here that, to clearly show the figure, in FIG. 34, a portion of reference numerals of the same concave portion and convex portion as the first embodiment is omitted.

The detailed optical data of the optical imaging lens 10 is as shown in FIG. 36, and in the eighth embodiment, the effective focal length of the whole optical imaging lens 10 is 2.700 mm, the HFOV thereof is 41.000°, the Fno thereof is 2.111, the system length thereof is 3.950 mm, and the image height thereof is 2.275 mm.

FIG. 37 shows each of the aspheric coefficients of the object-side surfaces 31, 41, 51, and 61 and the image-side surfaces 32, 42, 52, and 62 of the eighth embodiment in general formula (1).

Moreover, the relationship between each of the important parameters in the optical imaging lens 10 of the eighth embodiment is as shown in FIG. 48 and FIG. 49.

Figures 35A, 35B, 35C, 35D:
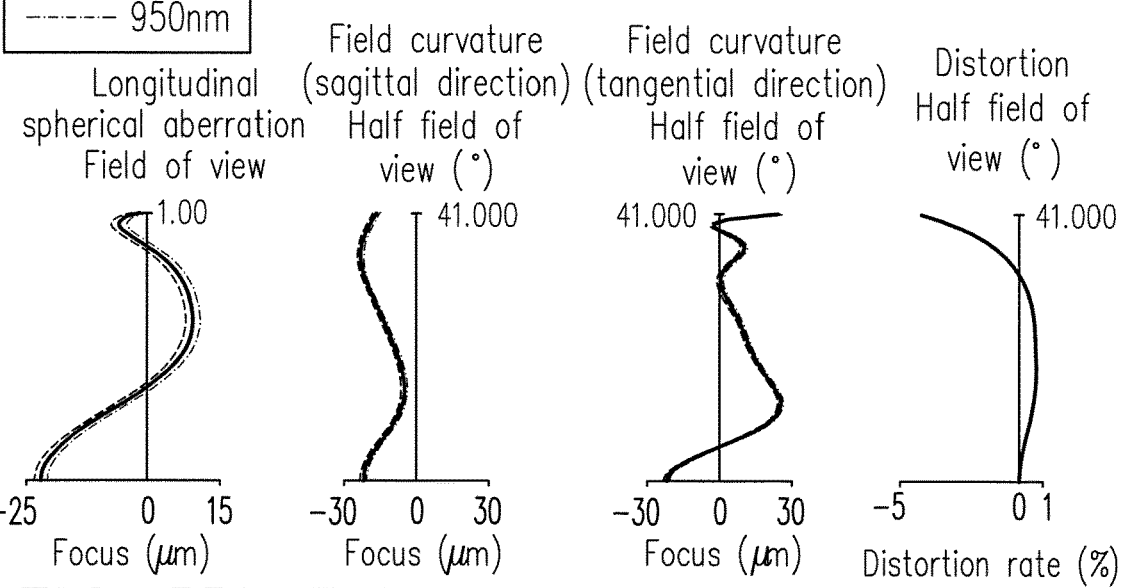
FIG. 35A to FIG. 35D are diagrams of the longitudinal spherical aberration and various aberrations of the optical imaging lens of the eighth embodiment.

In the longitudinal spherical aberration figure of FIG. 35A of the eighth embodiment in the condition that the pupil radius thereof is 0.6396 mm, the imaging point deviation of off-axis rays at different heights is controlled to be within the range of ±25 microns. In the two field curvature figures of FIG. 35B and FIG. 35C, the focal length variation amount of three representative wavelengths in the entire field of view is within ±28 microns. The distortion aberration figure of FIG. 35D shows that the distortion aberration of the eighth embodiment is maintained within the range of ±4.5%. Accordingly, in comparison to the current optical lens, in the eighth embodiment, good imaging quality can still be provided under the condition of the system length reduced to about 3.950 mm.

It can be known from the above that, advantages of the eighth embodiment in comparison to the first embodiment are: the system length of the optical imaging lens 10 of the eighth embodiment is shorter than that of the first embodiment, the f-number of the eighth embodiment is less than that of the first embodiment, the HFOV of the eighth embodiment is larger than that of the first embodiment, the longitudinal spherical aberration of the eighth embodiment is less than that of the first embodiment, the field curvature of the eighth embodiment is less than that of the first embodiment, and the eighth embodiment is easier to manufacture than the first embodiment, and therefore the yield is higher.

Figure 38:
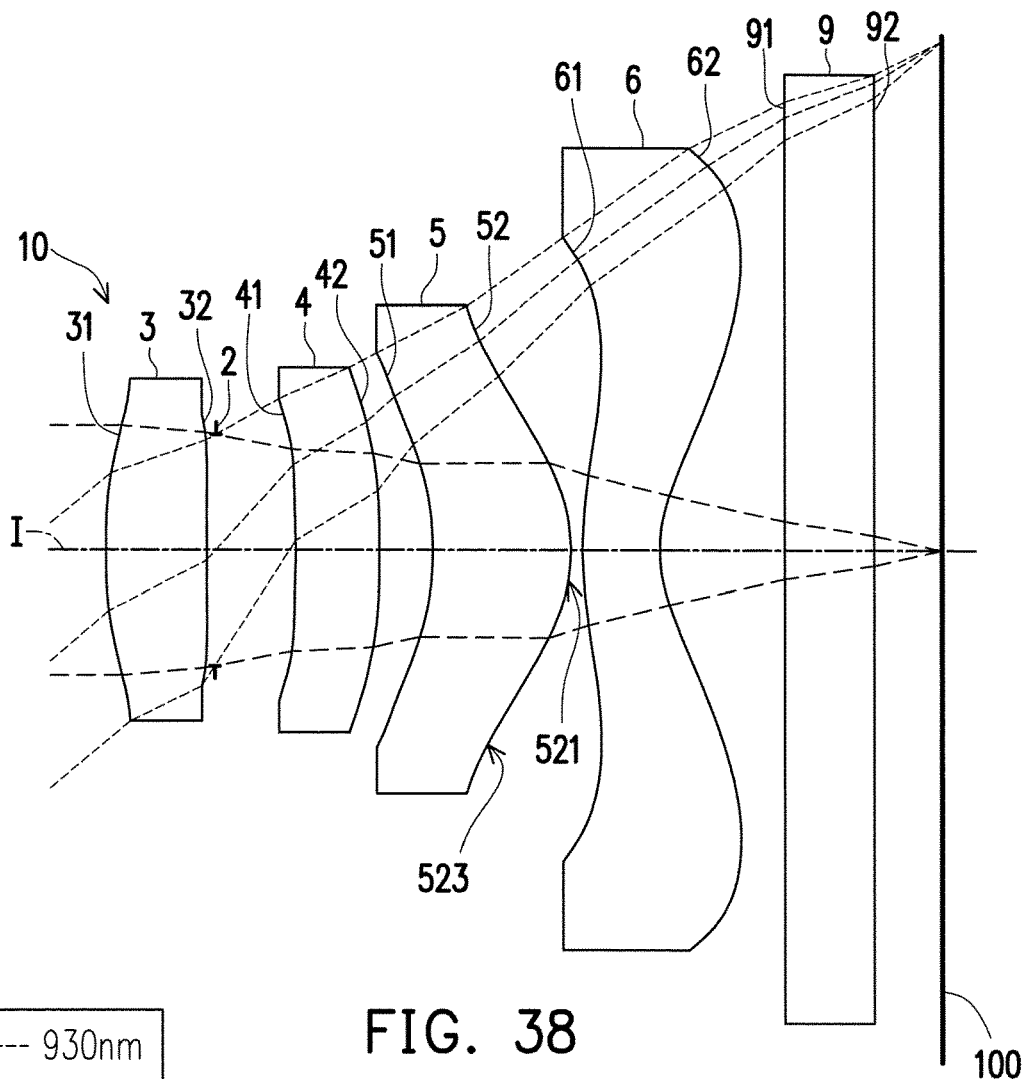
FIG. 38 is a schematic of an optical imaging lens of the ninth embodiment of the invention.

FIG. 38 is a schematic of an optical imaging lens of the ninth embodiment of the invention, and FIG. 39A to FIG. 39D are diagrams of the longitudinal spherical aberration and various aberrations of the optical imaging lens of the ninth embodiment. Referring first to FIG. 38, the ninth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. Moreover, in this embodiment, the aperture stop 2 is disposed between the first lens element 3 and the second lens element 4. In addition, in this embodiment, the image-side surface 52 of the third lens element 5 has a convex portion 521 in a vicinity of the optical axis I and a convex portion 523 in a vicinity of a periphery of the third lens element 3. It should be mentioned here that, to clearly show the figure, in FIG. 38, a portion of reference numerals of the same concave portion and convex portion as the first embodiment is omitted.

The detailed optical data of the optical imaging lens 10 is as shown in FIG. 40, and in the ninth embodiment, the effective focal length of the whole optical imaging lens 10 is 2.525 mm, the HFOV thereof is 41.309°, the Fno thereof is 2.200, the system length thereof is 3.689 mm, and the image height thereof is 2.275 mm.

FIG. 41 shows each of the aspheric coefficients of the object-side surfaces 31, 41, 51 and 61 and the image-side surfaces 32, 42, 52 and 62 of the ninth embodiment in general formula (1).

Moreover, the relationship between each of the important parameters in the optical imaging lens 10 of the ninth embodiment is as shown in FIG. 48 and FIG. 49.

Figures 39A, 39B, 39C, 39D:
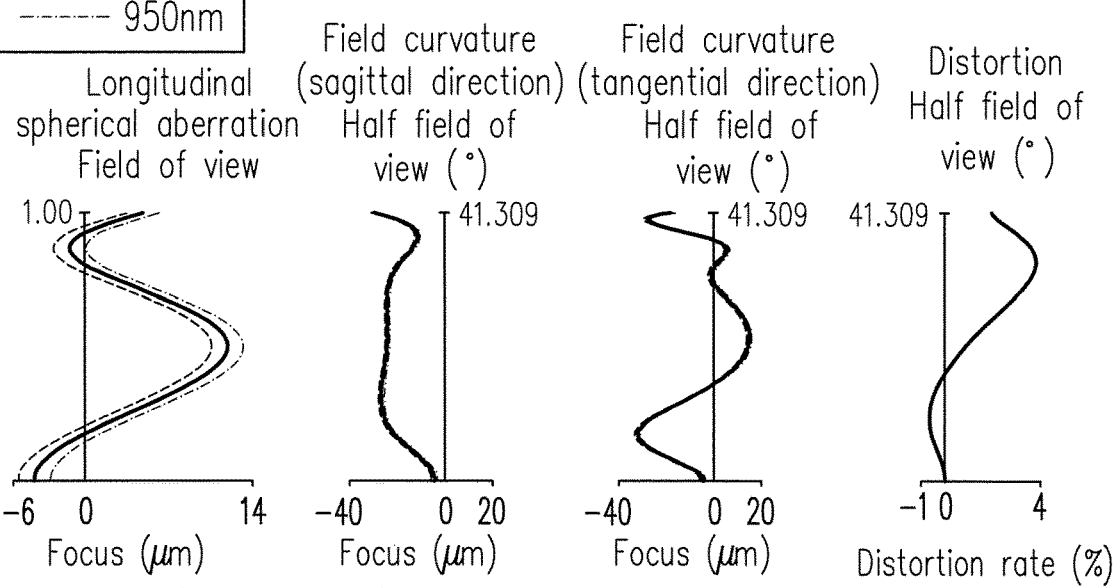
FIG. 39A to FIG. 39D are diagrams of the longitudinal spherical aberration and various aberrations of the optical imaging lens of the ninth embodiment.

In the longitudinal spherical aberration figure of FIG. 39A of the ninth embodiment in the condition that the pupil radius thereof is 0.5739 mm, the imaging point deviation of off-axis rays at different heights is controlled to be within the range of ±13.5 microns. In the two field curvature figures of FIG. 39B and FIG. 39C, the focal length variation amount of three representative wavelengths in the entire field of view is within ±35 microns. The distortion aberration figure of FIG. 39D shows that the distortion aberration of the ninth embodiment is maintained within the range of ±4%. Accordingly, in comparison to the current optical lens, in the ninth embodiment, good imaging quality can still be provided under the condition of the system length reduced to about 3.689 mm.

It can be known from the above that, the advantages of the ninth embodiment in comparison to the first embodiment are: the system length of the optical imaging lens 10 of the ninth embodiment is less than that of the first embodiment; the aperture stop 2 of the ninth embodiment is closer to the image plane 100 compared to the first embodiment, so that the HFOV of the ninth embodiment is larger than that of the first embodiment, and the image quality of the ninth embodiment is better than that of the first embodiment; the longitudinal spherical aberration of the ninth embodiment is less than that of the first embodiment, and the field curvature of the ninth embodiment is less than that of the first embodiment.

Figure 42:
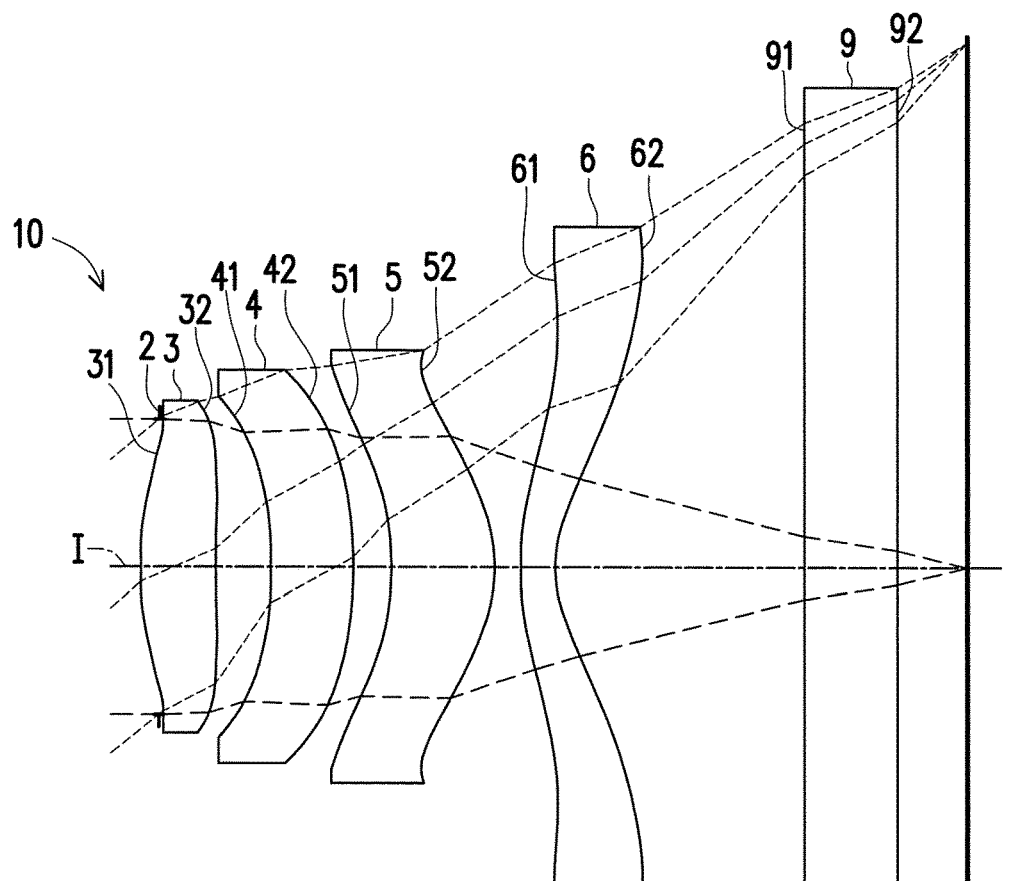
FIG. 42 is a schematic of an optical imaging lens of the tenth embodiment of the invention.

FIG. 42 is a schematic of an optical imaging lens of the tenth embodiment of the invention, and FIG. 43A to FIG. 43D are diagrams of the longitudinal spherical aberration and various aberrations of the optical imaging lens of the tenth embodiment. Referring first to FIG. 42, the tenth embodiment of the optical imaging lens 10 of the invention is similar to the first embodiment, and the difference therebetween is as follows. The optical data, the aspheric coefficients, and the parameters of the lens elements 3, 4, 5, and 6 are somewhat different. It should be mentioned here that, to clearly show the figure, in FIG. 42, a portion of reference numerals of the same concave portion and convex portion as the first embodiment is omitted.

The detailed optical data of the optical imaging lens 10 is as shown in FIG. 44, and in the tenth embodiment, the effective focal length of the whole optical imaging lens 10 is 2.402 mm, the HFOV thereof is 40.352°, the Fno thereof is 1.878, the system length thereof is 3.532 mm, and the image height thereof is 2.275 mm.

FIG. 45 shows each of the aspheric coefficients of the object-side surfaces 31, 41, 51, and 61 and the image-side surfaces 32, 42, 52, and 62 of the tenth embodiment in general formula (1).

Moreover, the relationship between each of the important parameters in the optical imaging lens 10 of the tenth embodiment is as shown in FIG. 48 and FIG. 49.

Figures 43A, 43B, 43C, 43D:
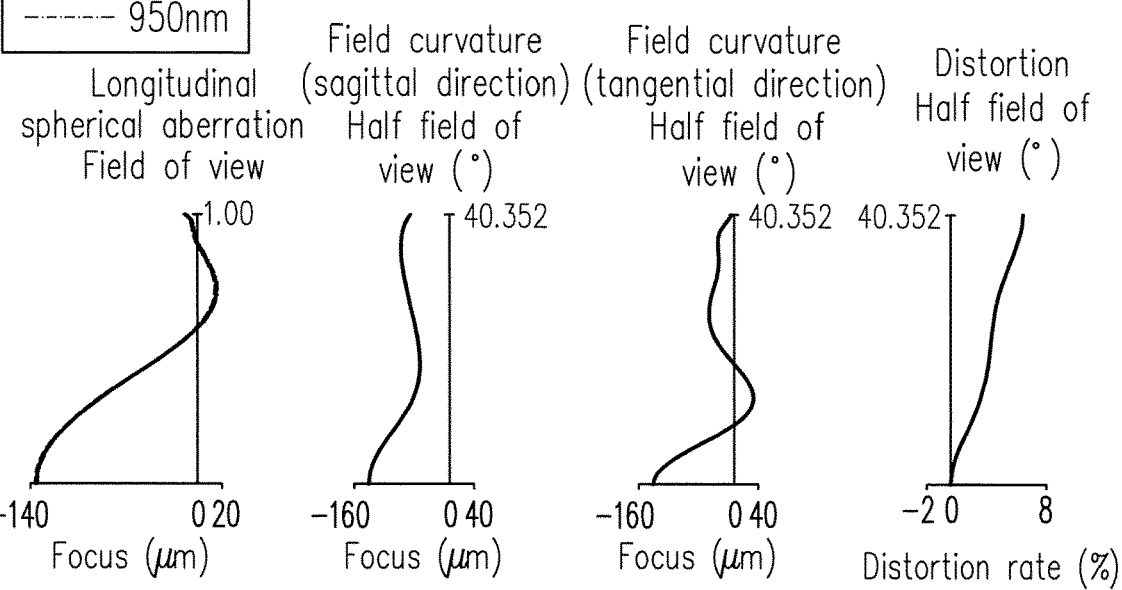
FIG. 43A to FIG. 43D are diagrams of the longitudinal spherical aberration and various aberrations of the optical imaging lens of the tenth embodiment.

In the longitudinal spherical aberration figure of FIG. 43A of the tenth embodiment in the condition that the pupil radius thereof is 0.6396 mm, the imaging point deviation of off-axis rays at different heights is controlled to be within the range of ±140 microns. In the two field curvature figures of FIG. 43B and FIG. 43C, the focal length variation amount of three representative wavelengths in the entire field of view is within +140 microns. The distortion aberration figure of FIG. 43D shows that the distortion aberration of the tenth embodiment is maintained within the range of ±6.2%. Accordingly, in comparison to the current optical lens, in the tenth embodiment, good imaging quality can still be provided under the condition of the system length reduced to about 3.532 mm.

It can be known from the above that, advantages of the tenth embodiment in comparison to the first embodiment are: the system length of the optical imaging lens 10 of the tenth embodiment is shorter than that of the first embodiment, the f-number of the tenth embodiment is less than that of the first embodiment, and the HFOV of the tenth embodiment is larger than that of the first embodiment.

FIG. 46 to FIG. 49 shows tables of each optical parameter of the ten embodiments. Through the arrangement of the below designs operated with one another, the lens length can be effectively reduced, ensure imaging quality, the clarity for partially or entirely imaging the object can be improved, and the field of view is increased.

1. The object-side surface 41 of the second lens element 4 having the concave portion 412 in the vicinity of the optical axis I, the image-side surface 42 of the second lens element 4 having the convex portion 423 in the vicinity of the periphery, and the object-side surface 51 of the third lens element 5 having the concave portion 514 in the vicinity of the periphery facilitate correcting the aberrations generated by the first lens element 3 and the second lens element 4. The object-side surface 61 of the fourth lens element 6 having the concave portion 614 in the vicinity of the periphery is further selectively adopted to facilitate mainly correcting each aberration. The first lens element 3 having positive refracting power or the third lens element 5 having positive refracting power facilitate collecting image rays and increasing the field of view.

2. The fourth lens element 6 having negative refracting power is further selectively adopted to facilitate correcting the aberrations generated by the first lens element 3, the second lens element 4 and the third lens element 5.

3. The optical imaging lens 10 satisfying 30.000≤V4−V1 can effectively reduce the chromatic aberration of the optical imaging lens 10 and improve the image quality thereof. Preferably, the optical imaging lens 10 satisfies 30.000≤V4−V1≤40.000.

When the relationship formula between each optical parameter in the optical imaging lens 10 of the embodiments of the invention satisfies at least one of the following condition formulas, the designer can design an optical imaging lens having good optical performance and reduced overall length and being technically applicable:

1. In order to achieve reduced lens system length, in the embodiments of the invention, the lens element thickness and the air gap between the lens elements are suitably reduced. However, under the premise of considering the difficulty of the lens assembly process and achieving imaging quality, the lens element thickness and the air gap between the lens elements need to be adjusted together, or the ratio of the combination of specific optical parameters in specific lens elements is adjusted, and therefore by satisfying the numeric value limitation of the following condition formulas, the optical imaging system can achieve better configuration:

$T2/G12 \leq 2.200$, preferably $0.200 \leq T2/G12 \leq 2.200$;

$(G23+G34+T4)/G12 \leq 1.800$, preferably $1.200 \leq (G23+G34+T4)/G12 \leq 1.800$;

$ALT/G12 \leq 6.200$, preferably $2.700 \leq ALT/G12 \leq 6.200$;

$BFL/T3 \leq 4.600$, preferably $1.100 \leq BFL/T3 \leq 4.600$;

$BFL/AAG \leq 3.500$, preferably $0.700 \leq BFL/AAG \leq 3.500$;

$AAG/(G23+G34+T4) \leq 1.200$, preferably $0.500 \leq AAG/(G23+G34+T4) \leq 1.200$;

$(G23+G34+T4)/T1 \leq 1.800$, preferably $0.800 \leq (G23+G34+T4)/T1 \leq 1.800$;

$AAG/G12 \leq 2.200$, preferably $1.000 \leq AAG/G12 \leq 2.200$.

2. When the optical imaging lens 10 satisfies at least one of the following condition formulas, the EFL is shortened to facilitate increasing the field of view, so that the EFL is designed to be small. Moreover, if the optical imaging lens 10 satisfies at least one of the following condition formulas, when the thickness of the optical system is reduced, the field of view is easy to be increased.

$EFL/T2 \leq 7.700$, preferably $2.100 \leq EFL/T2 \leq 7.700$;

$EFL/T3 \leq 6.300$, preferably $1.400 \leq EFL/T3 \leq 6.300$;

$EFL/ALT \leq 1.900$, preferably $0.700 \leq EFL/ALT \leq 1.900$.

3. In order to maintain a ratio of the optical element parameter to the lens length at a suitable value, satisfying at least one of the following conditional formulas can facilitate preventing difficulty in manufacturing due to small parameters or excessive system length of the lens due to large parameters:

$TL/BFL \leq 2.300$, preferably $1.000 \leq TL/BFL \leq 2.300$;

$TTL/T1 \leq 11.000$, preferably $6.900 \leq TTL/T1 \leq 11.000$;

$TTL/T2 \leq 10.000$, preferably $5.000 \leq TTL/T2 \leq 10.000$;

$TTL/T3 \leq 8.000$, preferably $3.600 \leq TTL/T3 \leq 8.000$;

$TTL/AAG \leq 8.200$, preferably $2.900 \leq TTL/AAG \leq 8.200$;

$TL/ALT \leq 1.500$, preferably $1.000 \leq TL/ALT \leq 1.500$;

$TL/T1 \leq 5.800$, preferably $4.200 \leq TL/T1 \leq 5.800$.

However, based on the unpredictability of the optical system design, under the designs of the embodiments of the invention, by satisfying the above condition formulas, in the embodiments of the invention, lens length can be reduced, usable aperture is increased, field of view is increased, and imaging quality is increased, or assembly yield is increased such that the drawbacks of the prior art are reduced.

Based on the above, the optical imaging lens 10 of the embodiments of the invention may achieve the following efficacies and advantages:

1. The longitudinal spherical aberration, the field curvature, and the distortion of each embodiment of the invention all satisfy usage criteria. Moreover, the three representative wavelengths of 930 nm, 940 nm, and 950 nm are all concentrated in a vicinity of the imaging point at different heights of off-axis rays, and it can be seen from the deflection amplitude of each curve that the imaging point deviations at different heights of the off-axis rays can all achieve control and have good spherical aberration, aberration, and distortion control capability. Referring further to the imaging quality data, the distances between the three representative wavelengths of 930 nm, 940 nm, and 950 nm are also relatively close, indicating that the concentration of rays having different wavelengths under various states in the embodiments of the invention is good and excellent dispersion reduction capability is achieved, and therefore it can be known from the above that the embodiments of the invention have good optical performance. The optical imaging lens 10 of the embodiments of the invention can be used as night vision lens for IR imaging or pupil recognition lens, and it can be known from the above that the optical imaging lens 10 has good imaging effect to IR.

2. In addition, the aforementioned limitation relations are provided in an exemplary sense and can be randomly and selectively combined and applied to the embodiments of the invention in different manners; the invention should not be limited to the above examples.

3. All of the numerical ranges including the maximum and minimum values and the values therebetween which are obtained from the combining proportion relation of the optical parameters disclosed in each embodiment of the invention are implementable.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical imaging lens comprising a first lens element, a second lens element, a third lens element, and a fourth lens element from an object side to an image side in order along an optical axis, wherein the first lens element to the fourth lens element each comprise an object-side surface facing the object side and allowing imaging rays to pass through and an image-side surface facing the image side and allowing the imaging rays to pass through;

the object-side surface of the second lens element has a concave portion in a vicinity of the optical axis, and the image-side surface of the second lens element has a convex portion a periphery region of the second lens element;

the object-side surface of the third lens element has a concave portion in a periphery region of the third lens element;

the fourth lens element has negative refracting power; and only the first lens element, the second lens element, the third lens element, and the fourth lens element have refracting power, wherein the optical imaging lens satisfies:

$V4 - V1 \geq 30$, where V4 is an Abbe number of the fourth lens element, and V1 is an Abbe number of the first lens element.

2. The optical imaging lens of claim 1, wherein the optical imaging lens further satisfies: $TTL/T1 \leq 11.000$, where TTL is a distance from the object-side surface of the first lens element to an image plane of the optical imaging lens on the optical axis, and T1 is a thickness of the first lens element on the optical axis.

3. The optical imaging lens of claim 1, wherein the optical imaging lens further satisfies: $EFL/T2 \leq 7.700$, where EFL is an effective focal length of the optical imaging lens, and T2 is a thickness of the second lens element on the optical axis.

4. The optical imaging lens of claim 1, wherein the optical imaging lens further satisfies: $TL/BFL-2.300$, where TL is a distance from the object-side surface of the first lens element to the image-side surface of the fourth lens element on the optical axis, and BFL is a distance from the image-side surface of the fourth lens element to an image plane of the optical imaging lens on the optical axis.

5. The optical imaging lens of claim 1, wherein the optical imaging lens further satisfies: $AAG/(G23+G34+T4) \leq 1.200$, where AAG is a sum of three air gaps from the first lens element to the fourth lens element on the optical axis, G23 is an air gap from the second lens element to the third lens element on the optical axis, G34 is an air gap from the third lens element to the fourth lens element on the optical axis, and T4 is a thickness of the fourth lens element on the optical axis.

6. The optical imaging lens of claim 1, wherein the optical imaging lens further satisfies: $BFL/T3 \leq 4.600$, where BFL is a distance from the image-side surface of the fourth lens element to an image plane of the optical imaging lens on the optical axis, and T3 is a thickness of the third lens element on the optical axis.

7. The optical imaging lens of claim 1, wherein the optical imaging lens further satisfies: $ALT/G12 \leq 6.200$, where ALT is a sum of thicknesses of the first lens element, the second lens element, the third lens element, and the fourth lens element on the optical axis, and G12 is an air gap from the first lens element to the second lens element on the optical axis.

8. An optical imaging lens comprising a first lens element, a second lens element, a third lens element, and a fourth lens element from an object side to an image side in order along an optical axis, wherein the first lens element to the fourth lens element each comprise an object-side surface facing the object side and allowing imaging rays to pass through and an image-side surface facing the image side and allowing the imaging rays to pass through;

the first lens element has positive refracting power;
the object-side surface of the second lens element has a concave portion in a vicinity of the optical axis, and the image-side surface of the second lens element has a convex portion in a periphery region of the second lens element;
the object-side surface of the third lens element has a concave portion in a periphery region of the third lens element;
the object-side surface of the fourth lens element has a concave portion in a periphery region of the fourth lens element; and
only the first lens element, the second lens element, the third lens element, and the fourth lens element have refracting power,
wherein the optical imaging lens satisfies:

$V4-V1 \geq 30$, where V4 is an Abbe number of the fourth lens element, and V1 is an Abbe number of the first lens element.

9. The optical imaging lens of claim 8, wherein the optical imaging lens further satisfies: TTL/T2≤10.000, where TTL is a distance from the object-side surface of the first lens element to an image plane of the optical imaging lens on the optical axis, and T2 is a thickness of the second lens element on the optical axis.

10. The optical imaging lens of claim 8, wherein the optical imaging lens further satisfies: EFL/T3≤6.300, where EFL is an effective focal length of the optical imaging lens, and T3 is a thickness of the third lens element on the optical axis.

11. The optical imaging lens of claim 8, wherein the optical imaging lens further satisfies: TL/ALT≤1.500, where TL is a distance from the object-side surface of the first lens element to the image-side surface of the fourth lens element on the optical axis, and ALT is a sum of thicknesses of the first lens element, the second lens element, the third lens element, and the fourth lens element on the optical axis.

12. The optical imaging lens of claim 8, wherein the optical imaging lens further satisfies: (G23+G34+T4)/T1≤1.800, where G23 is an air gap from the second lens element to the third lens element on the optical axis, G34 is an air gap from the third lens element to the fourth lens element on the optical axis, T4 is a thickness of the fourth lens element on the optical axis, and T1 is a thickness of the first lens element on the optical axis.

13. The optical imaging lens of claim 8, wherein the optical imaging lens further satisfies: BFL/AAG≤3.500, where BFL is a distance from the image-side surface of the fourth lens element to an image plane of the optical imaging lens on the optical axis, and AAG is a sum of three air gaps from the first lens element to the fourth lens element on the optical axis.

14. The optical imaging lens of claim 8, wherein the optical imaging lens further satisfies: T2/G12≤2.200, where T2 is a thickness of the second lens element on the optical axis, and G12 is an air gap from the first lens element to the second lens element on the optical axis.

15. An optical imaging lens comprising a first lens element, a second lens element, a third lens element, and a fourth lens element from an object side to an image side in order along an optical axis, wherein the first lens element to the fourth lens element each comprise an object-side surface facing the object side and allowing imaging rays to pass through and an image-side surface facing the image side and allowing the imaging rays to pass through;

the object-side surface of the second lens element has a concave portion in a vicinity of the optical axis, and the image-side surface of the second lens element has a convex portion in a periphery region of the second lens element;
the third lens element has positive refracting power, and the object-side surface of the third lens element has a concave portion in a periphery region of the third lens element;
the object-side surface of the fourth lens element has a concave portion in a periphery region of the fourth lens element; and
only the first lens element, the second lens element, the third lens element, and the fourth lens element have refracting power,
wherein the optical imaging lens satisfies:

$V4-V1 \geq 30$, where V4 is an Abbe number of the fourth lens element, and V1 is an Abbe number of the first lens element.

16. The optical imaging lens of claim 15, wherein the optical imaging lens further satisfies: TTL/T3≤8.000, where TTL is a distance from the object-side surface of the first lens element to an image plane of the optical imaging lens on the optical axis, and T3 is a thickness of the third lens element on the optical axis.

17. The optical imaging lens of claim 15, wherein the optical imaging lens further satisfies: EFL/ALT≤1.900, where EFL is an effective focal length of the optical imaging lens, and ALT is a sum of thicknesses of the first lens element, the second lens element, the third lens element, and the fourth lens element on the optical axis.

18. The optical imaging lens of claim 15, wherein the optical imaging lens further satisfies: TL/T1≤5.800, where TL is a distance from the object-side surface of the first lens element to the image-side surface of the fourth lens element on the optical axis, and T1 is a thickness of the first lens element on the optical axis.

19. The optical imaging lens of claim 15, wherein the optical imaging lens further satisfies: (G23+G34+T4)/G12≤1.800, where G23 is an air gap from the second lens element to the third lens element on the optical axis, G34 is an air gap from the third lens element to the fourth lens element on the optical axis, T4 is a thickness of the fourth lens element on the optical axis, and G12 is an air gap from the first lens element to the second lens element on the optical axis.

20. The optical imaging lens of claim 15, wherein the optical imaging lens further satisfies: TTL/AAG≤8.200, where TTL is a distance from the object-side surface of the first lens element to an image plane of the optical imaging lens on the optical axis, and AAG is a sum of three air gaps from the first lens element to the fourth lens element on the optical axis.

21. The optical imaging lens of claim 15, wherein a thickness of the second lens element on the optical axis is greater than a thickness of the fourth lens element on the optical axis.

\* \* \* \* \*